United States Patent
Meissner et al.

(10) Patent No.: US 11,907,829 B2
(45) Date of Patent: Feb. 20, 2024

(54) FMCW RADAR WITH INTERFERENCE SIGNAL SUPPRESSION USING ARTIFICIAL NEURAL NETWORK

(71) Applicant: Infineon Technologies AG, Neubiberg (DE)

(72) Inventors: Paul Meissner, Feldkirchen bei Graz (AT); Franz Pernkopf, Graz (AT); Johanna Rock, Graz (AT); Wolfgang Roth, Graz (AT); Mate Andras Toth, Graz (AT); Alexander Fuchs, Kaindorf bei Hartberg (AT)

(73) Assignee: Infineon Technologies AG, Neubiberg (DE)

( * ) Notice: Subject to any disclaimer, the term of this patent is extended or adjusted under 35 U.S.C. 154(b) by 365 days.

(21) Appl. No.: 17/121,295

(22) Filed: Dec. 14, 2020

(65) Prior Publication Data
US 2021/0209453 A1    Jul. 8, 2021

Related U.S. Application Data

(63) Continuation-in-part of application No. 16/923,916, filed on Jul. 8, 2020, which is a continuation-in-part
(Continued)

(30) Foreign Application Priority Data

Mar. 14, 2019    (DE) .......................... 102019106529.1

(51) Int. Cl.
G06N 3/063    (2023.01)
G06N 3/04    (2023.01)
(Continued)

(52) U.S. Cl.
CPC .............. *G06N 3/063* (2013.01); *G01S 7/417* (2013.01); *G06N 3/04* (2013.01); *G01S 7/023* (2013.01);
(Continued)

(58) Field of Classification Search
CPC ........ G06N 3/063; G06N 3/04; G06N 3/0454; G06N 3/0481; G06N 3/084; G01S 7/417;
(Continued)

(56) References Cited

U.S. PATENT DOCUMENTS 5,345,539 A    9/1994    Webb
10,879,946 B1    12/2020    Shima
(Continued)

FOREIGN PATENT DOCUMENTS

CN    109460815 A  *    3/2019    .......... G06N 3/0454
DE    102009047012 A1    5/2011
(Continued)

OTHER PUBLICATIONS

Hubara et al., "Binarized Neural Networks," 30th Conference on Neural Information Processing Systems {NIPS 2016), Spain, 9 pages.
(Continued)

*Primary Examiner* — Timothy A Brainard
*Assistant Examiner* — Ismaaeel A. Siddiquee
(74) *Attorney, Agent, or Firm* — Harrity & Harrity, LLP

(57) ABSTRACT

A radar device may include a radar transmitter to output a radio frequency (RF) transmission signal including a plurality of frequency-modulated chirps. The radar device may include a radar receiver to receive an RF radar signal, and generate, based on the RF radar signal, a dataset including a set of digital values, the dataset being associated with a chirp or a sequence of successive chirps. The radar device may include a neural network to filter the dataset to reduce
(Continued)

an interfering signal included in the dataset, the neural network being a convolutional neural network. At least one layer of the neural network may be a complex-valued neural network layer includes complex-valued weighting factor, where the complex-valued neural network layer is configured to perform one or more operations according to a complex-valued computation.

20 Claims, 15 Drawing Sheets

Related U.S. Application Data of application No. 16/817,385, filed on Mar. 12, 2020.

(51) Int. Cl.
| | | |
|---|---|---|
| *G01S 7/41* | (2006.01) | |
| *G01S 7/35* | (2006.01) | |
| *G06N 3/048* | (2023.01) | |
| *G01S 13/58* | (2006.01) | |
| *G06N 3/084* | (2023.01) | |
| *G01S 7/02* | (2006.01) | |
| *G06N 3/045* | (2023.01) | |
| *G01S 13/34* | (2006.01) | |
| *G01S 13/44* | (2006.01) | |
| *G01S 13/931* | (2020.01) | |

(52) U.S. Cl.
CPC .............. *G01S 7/352* (2013.01); *G01S 7/354* (2013.01); *G01S 7/356* (2021.05); *G01S 13/343* (2013.01); *G01S 13/4454* (2013.01); *G01S 13/584* (2013.01); *G01S 13/931* (2013.01); *G06N 3/045* (2023.01); *G06N 3/048* (2023.01); *G06N 3/084* (2013.01)

(58) Field of Classification Search
CPC ...... G01S 13/343; G01S 13/584; G01S 7/352; G01S 7/354; G01S 7/356; G01S 13/4454; G01S 13/931; G01S 7/023
See application file for complete search history.

(56) References Cited

U.S. PATENT DOCUMENTS

| | | | | |
|---|---|---|---|---|
| 2010/0184395 | A1* | 7/2010 | Bagge | H04W 48/16 455/161.1 |
| 2016/0132768 | A1* | 5/2016 | Ray | G06N 3/08 706/22 |
| 2016/0223651 | A1 | 8/2016 | Kamo et al. | |
| 2017/0180160 | A1 | 6/2017 | Moorti et al. | |
| 2018/0149730 | A1* | 5/2018 | Li | G01S 7/0234 |
| 2018/0260702 | A1 | 9/2018 | Yamamoto et al. | |
| 2018/0348343 | A1* | 12/2018 | Achour | H01Q 1/364 |
| 2018/0348365 | A1 | 12/2018 | Achour et al. | |
| 2019/0066713 | A1 | 2/2019 | Mesgarani et al. | |
| 2019/0122105 | A1* | 4/2019 | Boybat Kara | G06N 3/084 |
| 2019/0279366 | A1* | 9/2019 | Sick | G01S 13/931 |
| 2019/0347550 | A1 | 11/2019 | Jung et al. | |
| 2020/0012926 | A1* | 1/2020 | Murata | G06N 3/04 |
| 2020/0042873 | A1* | 2/2020 | Daval Frerot | G06N 20/00 |
| 2020/0285954 | A1 | 9/2020 | Li et al. | |
| 2020/0292660 | A1 | 9/2020 | Meissner | |
| 2020/0293863 | A1 | 9/2020 | Gatot et al. | |
| 2020/0341109 | A1 | 10/2020 | Meissner | |
| 2020/0342315 | A1* | 10/2020 | Achterhold | G06N 3/04 |
| 2021/0224640 | A1 | 7/2021 | Nakahara | |
| 2021/0318853 | A1 | 10/2021 | Morie et al. | |
| 2022/0366253 | A1* | 11/2022 | Ozcan | G02B 5/1866 |

FOREIGN PATENT DOCUMENTS

| | | |
|---|---|---|
| DE | 102017007961 A1 | 1/2018 |
| KR | 102137825 B1 | 7/2020 |
| WO | 2018183546 A1 | 10/2018 |

OTHER PUBLICATIONS

Ioffe S., et al., "Batch Normalization: Accelerating Deep Network Training by Reducing Internal Covariate Shift," arXiv:502.03167v3 [cs.LG], Mar. 2, 2015, 11 pages.
Roth W., et al., "Training Discrete-Valued Neural Networks with Sign Activations Using Weight Distributions," Discrete-Valued Neural Networks Using Weight Distributions, In European Conference on Machine Learning {ECML), Published 2019, 17 pages.
Daniel A. Brooks et al., "Complex-valued neural networks for fully-temporal micro-Doppler classification", Jun. 2019, 10 pages.
Weichong Ng et al., "Range-Doppler Detection in Automotive Radar with Deep Learning", Jul. 2020, 8 pages.
Paul E. Gorday et al., "Complex-Valued Neural Networks for Noncoherent Demodulation", Dec. 18, 2019, 9 pages.

* cited by examiner

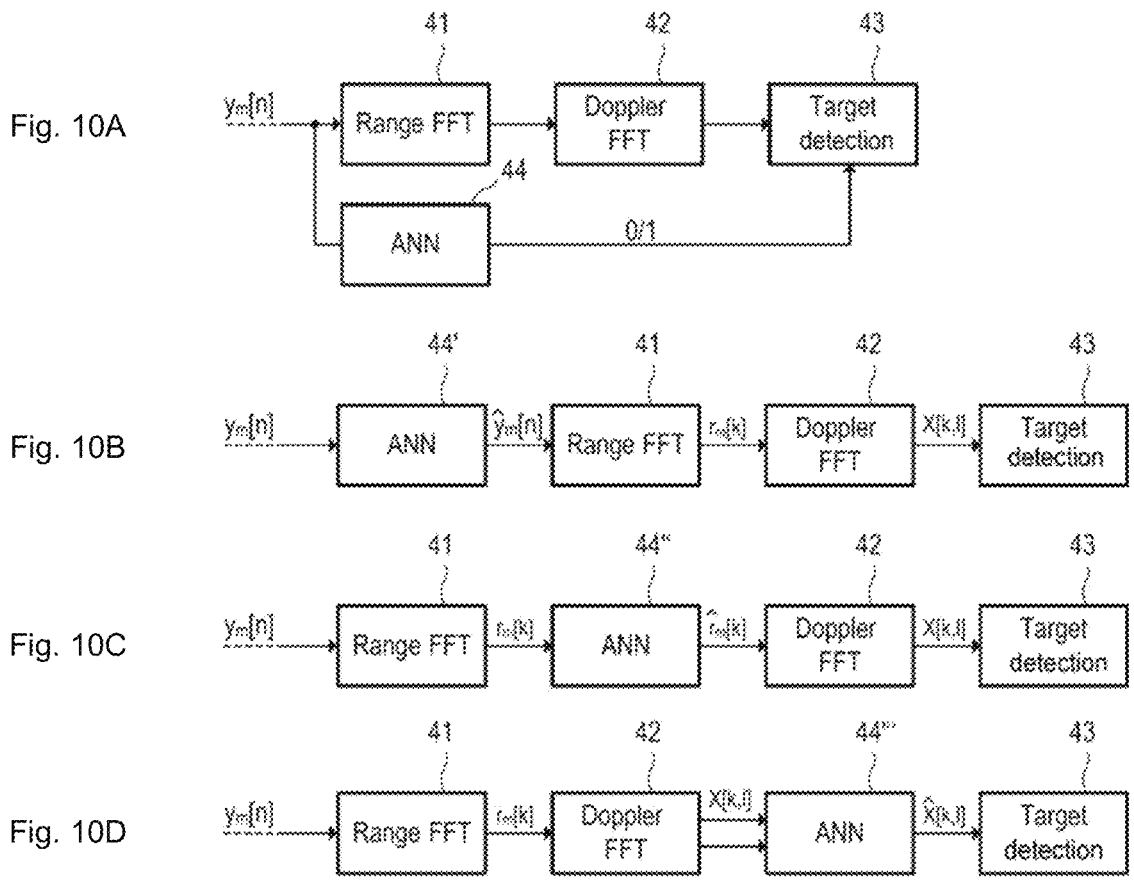
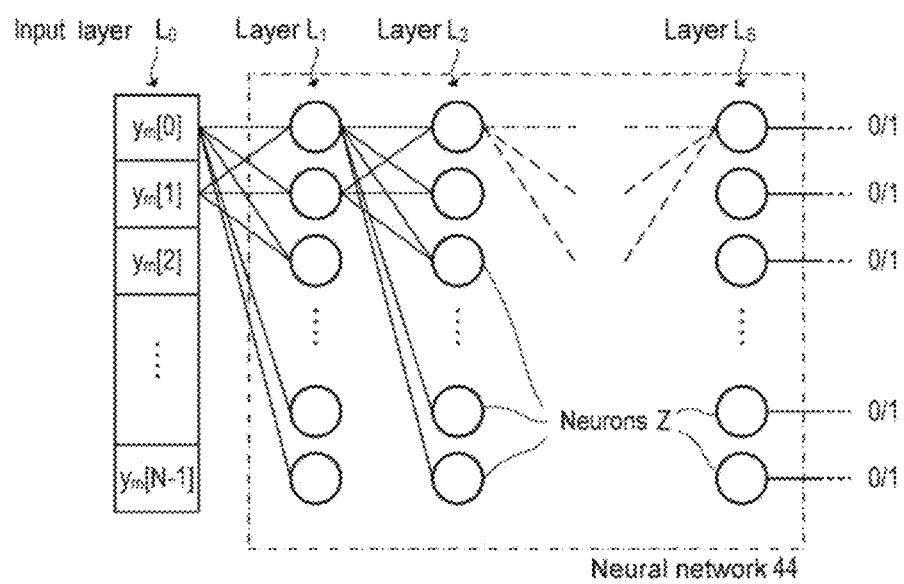
Fig. 11

FMCW RADAR WITH INTERFERENCE SIGNAL SUPPRESSION USING ARTIFICIAL NEURAL NETWORK

CROSS REFERENCE TO RELATED APPLICATION

This application is a continuation-in-part of U.S. patent application Ser. No. 16/923,916, filed on Jul. 8, 2020, and entitled "FMCW RADAR WITH INTERFERENCE SIGNAL SUPPRESSION USING ARTIFICIAL NEURAL NETWORK," which is a continuation-in-part of U.S. patent application Ser. No. 16/817,385, filed on Mar. 12, 2020, and is entitled "FMCW RADAR WITH INTERFERENCE SIGNAL SUPPRESSION USING ARTIFICIAL NEURAL NETWORK." U.S. patent application Ser. No. 16/923,916 and U.S. patent application Ser. No. 16/817,385 claim priority to German (DE) Patent Application No. 102019106529.1, filed on Mar. 14, 2019. The contents of said patent applications are incorporated by reference herein in their entirety.

TECHNICAL FIELD

The present description relates generally to the field of radar sensors, and signal processing methods used in radar sensors, which make it possible to suppress disruptive interference.

BACKGROUND

Radar sensors are used in a number of applications to detect objects, wherein the detection usually comprises measuring distances and speeds of the detected objects. In particular in the automotive sector, there is an increasing need for radar sensors that are able to be used, inter alia, in driving assistance systems (advanced driver assistance systems, ADAS), such as for example in adaptive cruise control (ACC) or radar cruise control systems. Such systems are automatically able to adjust the speed of a motor vehicle, in order thereby to maintain a safe distance from other motor vehicles traveling in front (and from other objects and from pedestrians). Further applications in the automotive sector are, for example, blind spot detection, lane change assist and the like. In the field of autonomous driving, radar sensors and systems having a plurality of sensors will play an important role in controlling autonomous vehicles.

Since automobiles are increasingly equipped with radar sensors, the probability of interference increases. That is to say, a radar signal emitted by a first radar sensor (installed in a first vehicle) may spread into the reception antenna of a second radar sensor (installed in a second vehicle). The first radar signal may interfere with an echo of the second radar signal in the second radar sensor and thereby impair the operation of the second radar sensor.

SUMMARY

A method for a radar device is described below. According to one example implementation, the method comprises transmitting a radio-frequency (RF) transmission signal that comprises a plurality of frequency-modulated chirps, and receiving an RF radar signal and generating a dataset containing in each case a particular number of digital values based on the received RF radar signal. A dataset may in this case be associated with a chirp or a sequence of successive chirps. The method furthermore comprises filtering the dataset by way of a neural network to which the dataset is fed, in order to reduce an interfering signal contained therein. A convolutional neural network may be used as the neural network.

A further example implementation relates to a radar device having a radar transmitter and a radar receiver. The radar transmitter is designed to output an RF transmission signal that comprises a plurality of frequency-modulated chirps. The radar receiver is designed to receive an RF radar signal and, based thereon, to generate a dataset containing in each case a particular number of digital values. A dataset may in this case be associated with a chirp or a sequence of successive chirps. The radar device furthermore comprises a neural network to which the dataset is fed and that is designed to filter the dataset in order to reduce an interfering signal contained therein. A convolutional neural network may be used as the neural network.

According to a further example implementation, the radar device comprises a radar receiver that is designed to receive an RF radar signal and, based thereon, to generate a digital signal that comprises a plurality of signal segments. The radar device furthermore comprises a neural network having a plurality of layers each having one or more neurons, wherein the signal segments are fed to an input layer of the plurality of layers and wherein the plurality of layers are designed to process the signal segments of the digital signal. An output layer of the plurality of layers has at least one neuron that delivers an output value that indicates whether a respective signal segment or a sample, able to be associated with the neuron, of the signal segment is overlaid with an interfering signal.

According to a further example implementation, a radar device comprises a radar receiver to receive an RF radar signal, and generate a digital signal based on the RF radar signal, the digital signal comprising a plurality of signal segments. The radar device further comprises a neural network comprising a plurality of layers to process the plurality of signal segments, each layer of the plurality of layers having one or more neurons, wherein the plurality of layers is to process the plurality of signal segments using weighting factors having values selected from a predetermined set of discrete values, and wherein at least one neuron in an output layer of the plurality of layers is to provide an output value that indicates whether a respective signal segment or a sample, associated with the at least one neuron, is overlaid with an interfering signal.

According to a further example implementation, a radar device comprises a radar transmitter to output an RF transmission signal that comprises a plurality of frequency-modulated chirps. The radar device further comprises a radar receiver to receive an RF radar signal, and generate a dataset including a set of digital values, the dataset being associated with one or more frequency-modulated chirps of the plurality of frequency-modulated chirps. The radar device further comprises a convolutional neural network to filter the dataset to reduce an interfering signal included in the dataset, wherein the convolutional neural network is to filter the dataset using weighting factors having values from a predetermined set of discrete values.

According to a further example implementation, a method of training a neural network, comprises initializing weighting factors of the neural network as weight distributions over a predetermined set of discrete values. The method further comprises propagating a subset of training data, from a set of training data, through the neural network, a result of propagating the subset of training data through the neural network being a prediction associated with the subset of training data. The method further comprises computing a value of a loss function based on the prediction associated with the subset of training data and a target associated with the subset of training data, the loss function is defined with respect to an expectation of the weight distributions. The method further comprises backpropagating the value of the loss function through the neural network, wherein the backpropagating comprises computing loss function gradients with respect to parameters of the weight distributions, and updating, based on the loss function gradients, the parameters of the weight distributions to determine updated weight distributions. The method further comprises updating the weighting factors of the neural network by sampling the updated weight distributions or by identifying most probable weights from the updated weight distributions, the updated weighting factors having values from the predetermined set of discrete values.

According to a further example implementation, a method of training a neural network comprises applying a quantization function to auxiliary real-valued weighting factors of the neural network to determine quantized weighting factors, the quantized weighting factors having values from a predetermined set of discrete values. The method further comprises propagating a subset of training data, from a set of training data, through the neural network, a result of propagating the subset of training data through the neural network being a prediction associated with the subset of training data. The method further comprises computing a value of a loss function based on the prediction associated with the subset of training data and a target associated with the subset of training data. The method further comprises backpropagating the value of the loss function through the neural network, wherein the backpropagating comprises computing loss function gradients with respect to the auxiliary real-valued weighting factors, wherein a gradient of the quantization function is assumed to be non-zero during the computing of the loss function gradients, and updating the auxiliary real-valued weighting factors of the neural network based on the loss function gradients.

According to a further example implementation, a radar device includes a radar receiver to receive an RF radar signal and, generate a digital signal based on the RF radar signal, the digital signal comprising a plurality of signal segments; and a neural network comprising a plurality of layers, each layer of the plurality of layers having one or more neurons, wherein at least one layer of the plurality of layers is a complex-valued neural network layer comprising complex-valued weighting factors, wherein the complex-valued neural network layer is configured to perform one or more operations according to a complex-valued computation, and wherein an output layer of the plurality of layers has at least one neuron that delivers an output value that indicates whether a respective signal segment or a sample, able to be associated with the neuron, of the plurality of signal segments, is overlaid with an interfering signal.

According to a further example implementation, a radar device includes a radar transmitter to output an RF transmission signal including a plurality of frequency-modulated chirps, a radar receiver to: receive an RF radar signal, a neural network to filter the dataset to reduce an interfering signal included in the dataset, the neural network being a convolutional neural network, wherein at least one layer of the neural network is a complex-valued neural network layer comprising complex-valued weighting factors, wherein the complex-valued neural network layer is configured to perform one or more operations according to a complex-valued computation.

According to a further example implementation, a method includes transmitting a an RF transmission signal including a plurality of frequency-modulated chirps; receiving an RF radar signal; generating, based on the RF radar signal, a dataset including a set of digital values, the dataset being associated with a chirp or a sequence of successive chirps; and filtering the dataset using a convolutional neural network, the convolutional neural network being configured to reduce an interfering signal included in the dataset, wherein at least one layer of the convolutional neural network is a complex-valued neural network layer comprising complex-valued weighting factors, wherein the complex-valued neural network layer is configured to perform one or more operations according to a complex-valued computation.

BRIEF DESCRIPTION OF THE DRAWINGS

Example implementations are explained in more detail below with reference to drawings. The illustrations are not necessarily true to scale, and the example implementations are not restricted just to the aspects that are illustrated. Rather, value is placed on illustrating the principles underlying the example implementations. In the drawings:

FIGS. 10A-10D illustrate various example structures of suppressing/filtering or detecting interference-induced (and other) disturbances using artificial neural networks.

FIG. 11 illustrates a first example according to which individual samples of a received radar signal that are disturbed by interference are detected by way of a neural network.

DETAILED DESCRIPTION

Figure 1:
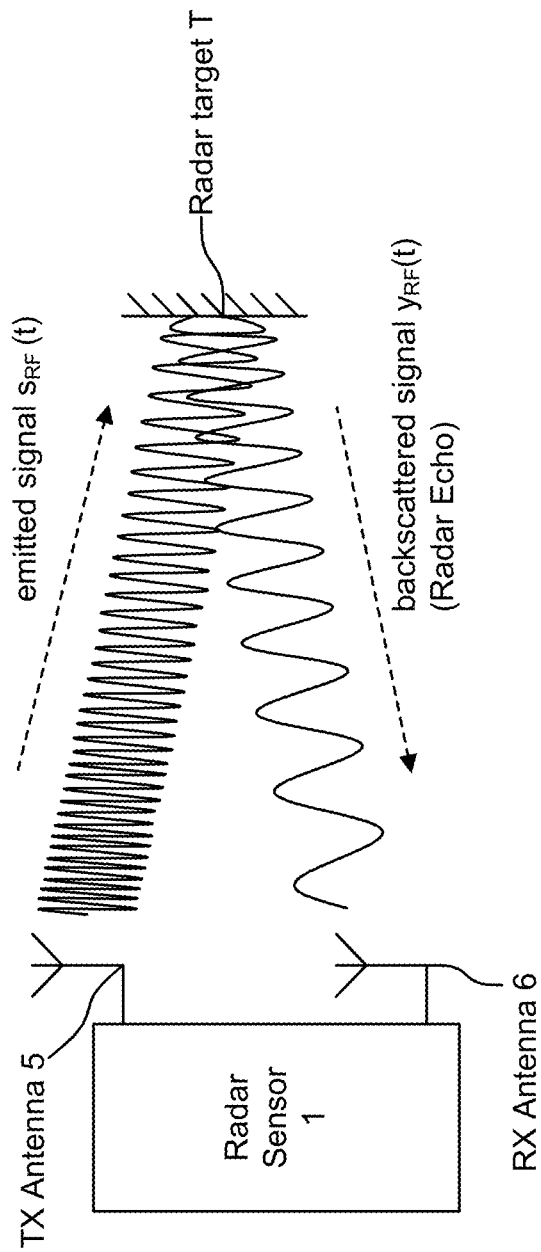
FIG. 1 is a sketch for illustrating functions of a frequency-modulated continuous-wave (FMCW) radar system for distance and/or speed measurement.

FIG. 1 illustrates, in a schematic diagram, the application of a frequency-modulated continuous-wave radar system—usually referred to as FMCW radar system—in the form of a sensor for measuring distances and speeds of objects, which are usually referred to as radar targets. In the present example, the radar device 1 has separate transmission (TX) and reception (RX) antennas 5 and 6, respectively (bistatic or pseudo-monostatic radar configuration). It is however noted that a single antenna may also be used that serves simultaneously as transmission antenna and as reception antenna (monostatic radar configuration). The transmission antenna 5 emits a continuous RF signal $s_{RF}(t)$, which is frequency-modulated for example with a type of sawtooth signal (periodic linear frequency ramp). The emitted signal $s_{RF}(t)$ is backscattered at the radar target T and the backscattered/reflected signal $y_{RF}(t)$ (echo signal) is received by the reception antenna 6. FIG. 1 shows a simplified example; in practice, radar sensors are systems with a plurality of transmission (TX) and reception (RX) channels in order also to be able to determine the direction of arrival (DoA) of the backscattered/reflected signal $y_{RF}(t)$ and thus locate the radar target T with greater accuracy.

Figure 2:
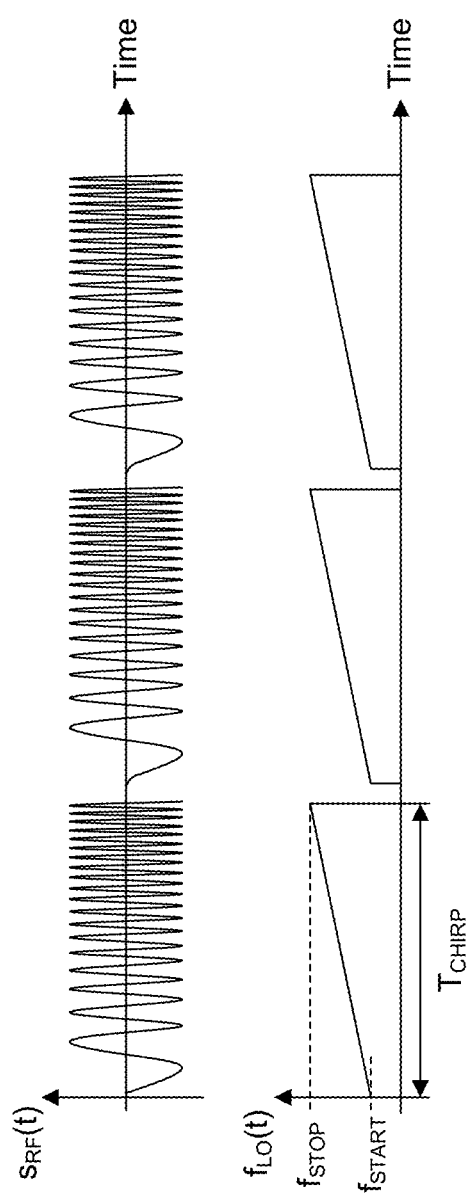
FIG. 2 comprises two timing diagrams for illustrating the frequency modulation (FM) of the RF signal generated by the FMCW system.

FIG. 2 illustrates, by way of example, the frequency modulation of the signal $s_{RF}(t)$. As illustrated in FIG. 2 (top graph), the emitted RF signal $s_{RF}(t)$ is composed of a series of "chirps", that is to say the signal $s_{RF}(t)$ comprises a sequence of sinusoidal signal profiles (waveforms) with rising frequency (up-chirp) or falling frequency (down-chirp). In the present example, the instantaneous frequency $f_{LO}(t)$ of a chirp increases linearly, starting at a start frequency $f_{START}$, to a stop frequency $f_{STOP}$ within a time interval $T_{RAMP}$ (see bottom graph in FIG. 2). Such chirps are also referred to as linear frequency ramps. FIG. 2 illustrates three identical linear frequency ramps. It is however noted that the parameters $f_{START}$, $f_{STOP}$, $T_{CHIRP}$ and the pause between the individual frequency ramps may vary. The frequency variation also does not necessarily have to be linear (linear chirp). Depending on the implementation, transmission signals with exponential or hyperbolic frequency variation (exponential or hyperbolic chirps) may also be used, for example. For a measurement, a sequence of frequency ramps is emitted, and the resulting echo signal is evaluated in baseband in order to detect one or more radar targets.

Figure 3:
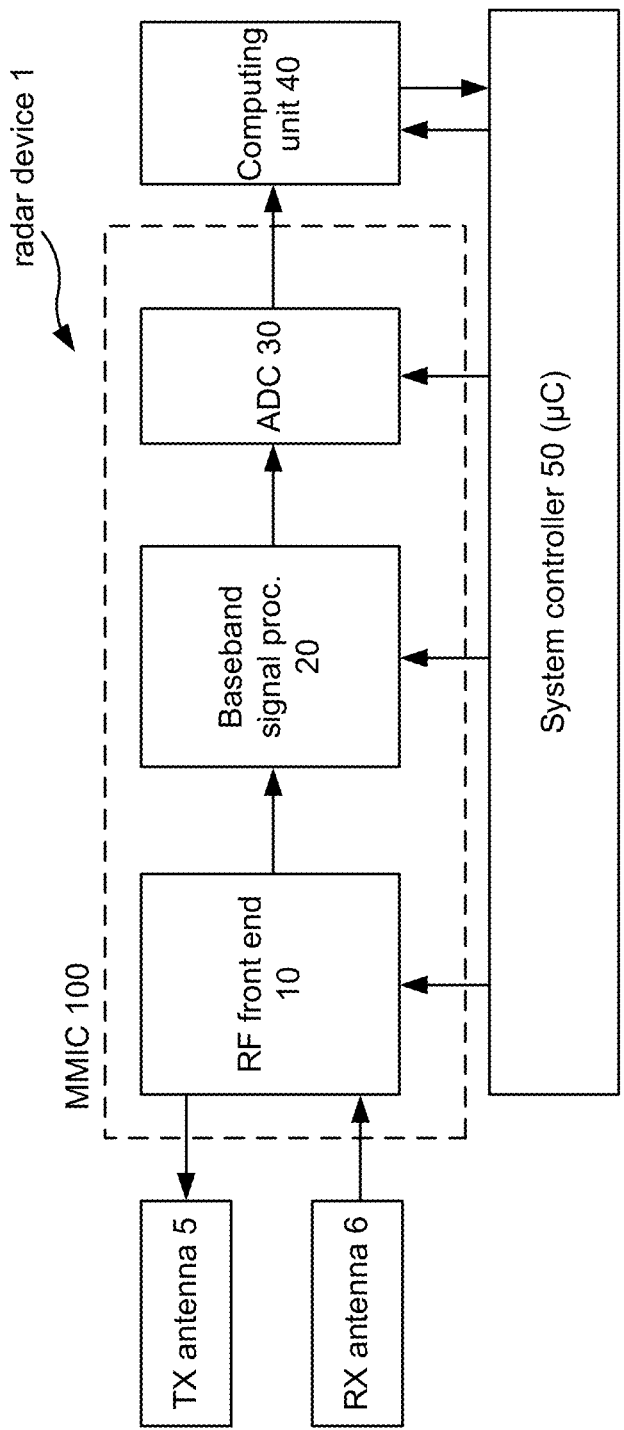
FIG. 3 is a block diagram for illustrating the structure of an FMCW radar system.

FIG. 3 is a block diagram that illustrates, by way of example, one possible structure of a radar device 1 (radar sensor). Accordingly, at least one transmission antenna 5 (TX antenna) and at least one reception antenna 6 (RX antenna) are connected to an RF front end 10 integrated into a chip, which front end may contain all those circuit components that are used for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 10 may—possibly together with further circuit components—be integrated into a chip, which is usually referred to as a monolithic microwave integrated circuit (MMIC). The IF band is sometimes also referred to as baseband. No further distinction is drawn below between baseband and IF band, and only the term baseband is used. Baseband signals are those signals on the basis of which radar targets are detected.

The example illustrated shows a bistatic (or pseudo-monostatic) radar system with separate RX and TX antennas. In the case of a monostatic radar system, the same antenna would be used both to emit and to receive the electromagnetic (radar) signals. In this case, a directional coupler (for example a circulator) may for example be used to separate the RF signals to be emitted from the received RF signals (radar echo signals). As mentioned, radar systems in practice usually have a plurality of transmission and reception channels with a plurality of transmission and reception antennas (antenna arrays), which makes it possible, inter alia, to measure the direction (DoA) from which the radar echoes are received. In the case of such MIMO systems (MIMO=multiple-input multiple-output), the individual TX channels and RX channels are usually in each case constructed identically or similarly and may be distributed over a plurality of integrated circuits (MMICs).

In the case of an FMCW radar system, the RF signals emitted by the TX antenna 5 may be for example in the range of approximately 20 GHz to 100 GHz (for example in the range of approximately 76-81 GHz in some applications). As mentioned, the RF signal received by the RX antenna 6 contains the radar echoes (chirp echo signals), that is to say those signal components that are backscattered at one or at a plurality of radar targets. The received RF signal $y_{RF}(t)$ is downmixed for example into baseband and processed further in baseband by way of analog signal processing (see FIG. 3, analog baseband signal processing chain 20). The analog signal processing essentially comprises filtering and possibly amplifying the baseband signal. The baseband signal is finally digitized (see FIG. 3, analog-to-digital converter 30) and processed further in the digital domain. The digital signal processing chain may be implemented at least partly in the form of software that is able to be executed on a processor, for example a microcontroller or a digital signal processor (see FIG. 3, computing unit 40). The overall system is generally controlled by way of a system controller 50 that may likewise be implemented at least partly in the form of software that is executed on a processor, such as for example a microcontroller. The RF front end 10 and the analog baseband signal processing chain 20 (optionally also the analog-to-digital converter 30 and the computing unit 40) may be integrated together in a single MMIC (that is to say an RF semiconductor chip). As an alternative, the individual components may also be distributed over a plurality of MMICs. The computing unit 40 or parts thereof may be contained in the system controller 50.

Figure 4:
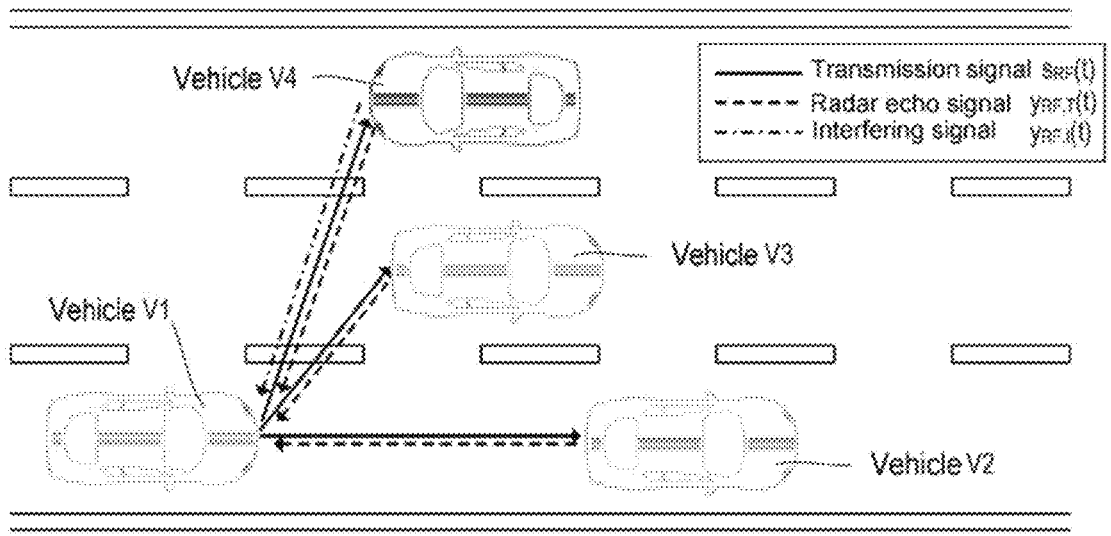
FIG. 4 is a sketch for illustrating an example of how interfering signals may be spread into the reception antenna of a radar sensor.

FIG. 4 illustrates a simple example for illustrating how an interferer may interfere with the received radar echoes. FIG. 4 illustrates a road with three lanes and four vehicles V1, V2, V3 and V4. At least the vehicles V1 and V4 are equipped with radar sensors. The radar sensor of the vehicle V1 emits an RF radar signal $s_{RF}(t)$ and the received RF radar signal $y_{RF}(t)$ contains the radar echoes from the vehicles V2 and V3 in front and the oncoming vehicle V4. The RF radar signal $y_{RF}(t)$ received by the radar sensor of the vehicle V1 furthermore contains a radar signal (interfering signal) that was generated by the radar sensor of the oncoming vehicle V4. The radar sensor of the vehicle V4 is an interferer for the radar sensor of the vehicle V1.

The signal $y_{RF}(t)$ received by the radar sensor of the vehicle V1 may be written as follows in the case of U radar targets and V interferers:

$$y_{RF}(t) = y_{RF,T}(t) + y_{RF,I}(t), \text{ wherein} \quad (1)$$

$$y_{RF,T}(t) = \sum_{i=0}^{U-1} A_{T,i} \cdot s_{RF}(t - \Delta t_{T,i}) \text{ and} \quad (2)$$

$$y_{RF,I}(t) = \sum_{k=0}^{V-1} A_{I,k} \cdot s_{RF,k}'(t - \Delta t_{I,k}). \quad (3)$$

In the above equations (1) to (3), the signal components $y_{RF,T}(t)$ and $y_{RF,I}(t)$ of the received signal $y_{RF}(t)$ correspond to the radar echoes from real radar targets $T_i$ and the interfering signals. A plurality of radar echoes and a plurality of interferers may be present in practice. Equation (2) therefore represents the sum of the radar echoes that are caused by U different radar targets $T_i$, wherein $A_{T,i}$ denotes the attenuation of the emitted radar signal and $\Delta t_{T,i}$ denotes the outward and return propagation time (round trip delay time, RTDT) for a particular radar target $T_i$. Similarly, equation (3) represents the sum of the interfering signals that are caused by V interferers. In this case, $A_{I,k}$ denotes the attenuation of the interfering signal $s_{RF,k}'(t)$ emitted by an interferer and $\Delta t_{I,k}$ represents the associated signal propagation time (for each interferer k=0, 1, . . . , V−1). It is noted that the radar signal $s_{RF}(t)$ emitted by the vehicle V1 and the interfering signal $s_{RF,0}'(t)$ emitted by the vehicle V4 (index k=0 for vehicle V4) will generally have different chirp sequences with different chirp parameters (start/stop frequency, chirp duration, repetition rate, etc.). The amplitude of the received interfering signal component $y_{RF,I}(t)$ may furthermore be considerably higher than the amplitude of the echo signal component $y_{RF,T}(t)$.

Figure 5:
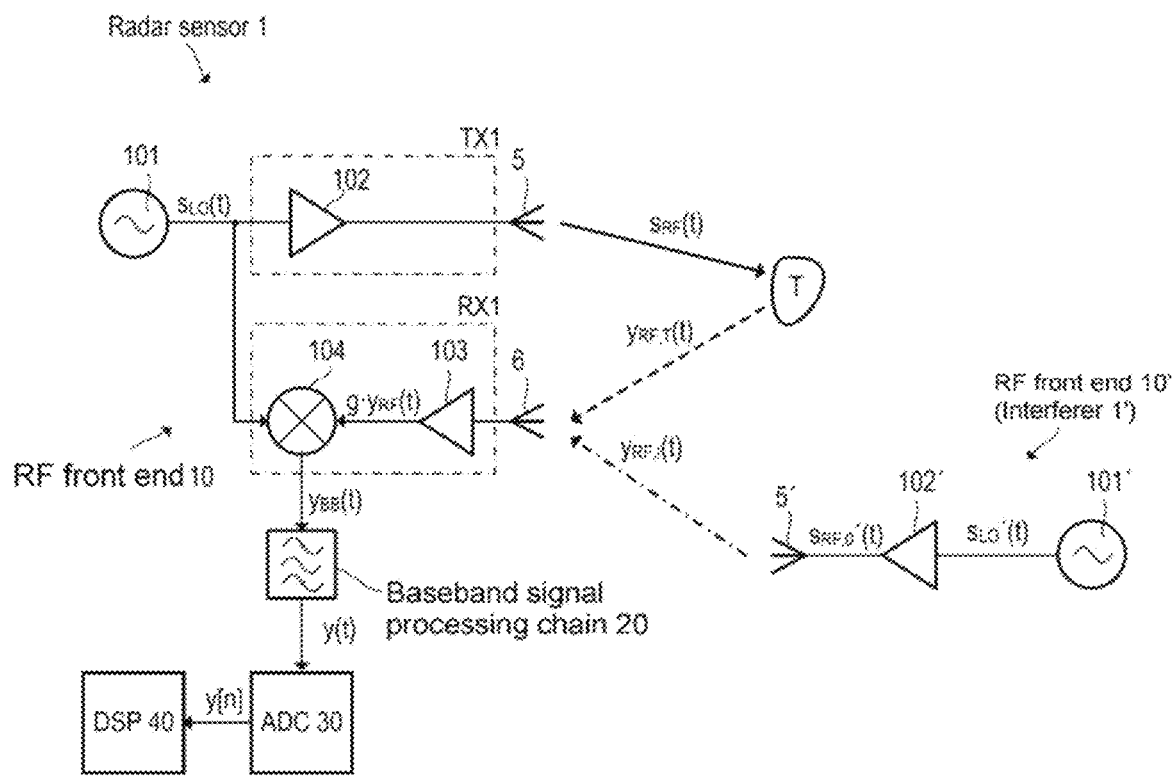
FIG. 5 is a circuit diagram for illustrating a simplified example of a radar transceiver and a further radar transceiver that causes interference.

FIG. 5 illustrates one example implementation of a radar transceiver 1 according to the example from FIG. 3 in more detail. The present example in particular illustrates the RF front end 10 of the radar transceiver 1 and the RF front end 10' of another (interfering) radar sensor 1'. It should be noted that FIG. 5 illustrates a simplified circuit diagram in order to show the fundamental structure of the RF front end 10 with one transmission channel (TX channel) and one reception channel (RX channel). As mentioned, actual implementations, which may depend greatly on the specific application, are usually more complex and have a plurality of TX and/or RX channels.

The RF front end 10 comprises a local oscillator 101 (LO) that generates an RF oscillator signal $s_{LO}(t)$. During operation—as described above with reference to FIG. 2—the RF oscillator signal $s_{LO}(t)$ is frequency-modulated and is also referred to as LO signal. In radar applications, the LO signal is usually in the SHF (super high frequency, centimeter wave) or in the EHF (extremely high frequency, millimeter wave) band, for example in the interval from 76 GHz to 81 GHz in some automotive applications. The LO signal $s_{LO}(t)$ is processed both in the transmission signal path TX1 (in the TX channel) and in the reception signal path RX1 (in the RX channel).

The transmission signal $s_{RF}(t)$ (cf. FIG. 2) emitted by the TX antenna 5 is generated by amplifying the LO signal $s_{LO}(t)$, for example by way of the RF power amplifier 102, and is thus merely an amplified and possibly phase-shifted version of the LO signal $s_{LO}(t)$. The output of the amplifier 102 may be coupled to the TX antenna 5 (in the case of a bistatic or pseudo-monostatic radar configuration). The reception signal $y_{RF}(t)$ received by the RX antenna 6 is fed to the receiver circuit in the RX channel and therefore directly or indirectly to the RF port of the mixer 104. In the present example, the RF reception signal $y_{RF}(t)$ (antenna signal) is pre-amplified by way of the amplifier 103 (amplification g). The mixer 104 thus receives the amplified RF reception signal $g \cdot y_{RF}(t)$. The amplifier 103 may be for example an LNA (low-noise amplifier). The LO signal $s_{LO}(t)$ is fed to the reference port of the mixer 104, such that the mixer 104 downmixes the (pre-amplified) RF reception signal $y_{RF}(t)$ into baseband. The downmixed baseband signal (mixer output signal) is referred to as $y_{BB}(t)$. This baseband signal $y_{BB}(t)$ is initially processed further in an analog manner, wherein the analog baseband signal processing chain 20 essentially brings about amplification and (for example band-pass or low-pass) filtering in order to suppress undesired sidebands and mirror frequencies. The resulting analog output signal, which is fed to an analog-to-digital converter (see FIG. 3, ADC 30), is referred to as y(t). Methods for the digital further processing of the digitized output signal (digital radar signal y[n]) are known per se (for example range Doppler analysis) and are therefore not discussed in more detail here. A few basics of range Doppler analysis are however explained further below with reference to FIG. 9.

In the present example, the mixer 104 downmixes the pre-amplified RF reception signal $g \cdot y_{RF}(t)$ (that is to say the amplified antenna signal) into baseband. The mixing may be performed in one stage (that is to say from the RF band directly into baseband) or over one or more intermediate stages (that is to say from the RF band into an intermediate frequency band and further into baseband). In this case, the reception mixer 104 effectively comprises a plurality of individual mixer stages connected in series. With regard to the example shown in FIG. 5, it becomes clear that the quality of a radar measurement depends strongly on the quality of the LO signal $s_{LO}(t)$, for example on the noise contained in the LO signal $s_{LO}(t)$, which is determined in terms of quantity by the phase noise of the local oscillator 101. A simple mixer is used in the illustrated example. As an alternative, in other example implementations, IQ mixers may also be used in order to generate complex baseband signals (in-phase and quadrature components).

FIG. 5 furthermore shows part (the TX channel of the RF front end 10') of a further radar sensor 1' that constitutes an interferer for the radar sensor 1. The RF front end 10' of the radar sensor 1' contains a further local oscillator 101' that generates an LO signal $s_{LO}'(t)$ that is amplified by the amplifier 102'. The amplified LO signal is emitted, as RF radar signal $s_{RF,0}'(t)$, by the antenna 5' of the radar sensor 1' (cf. equation (3)). This RF radar signal $s_{RF,0}'(t)$ contributes to the interfering signal component $y_{RF,I}(t)$ received by the antenna 6 of the other radar sensor 1 and may cause the interference.

Figure 6:
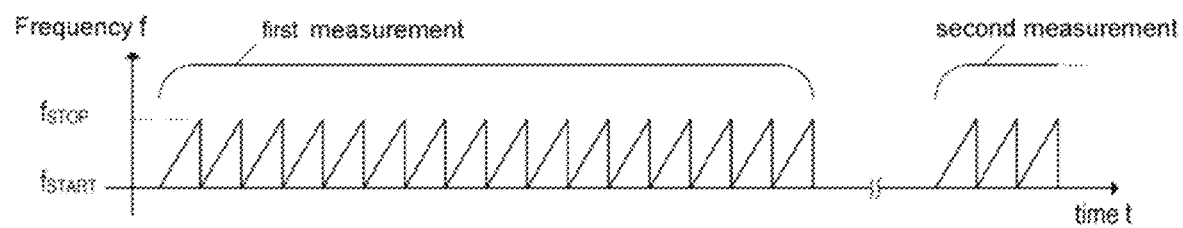
FIG. 6 shows a timing diagram (frequency over time) of an example of an emitted radar signal containing a plurality of sequences of chirps, wherein each sequence has a particular number of chirps that are used for a measurement.

FIG. 6 schematically illustrates an example of an FM scheme as is usually used in FMCW radar sensors in the frequency modulation (FM) of the LO signal $s_{LO}(t)$. A sequence of chirps is generated for each measurement in the illustrated example. The first sequence contains only 16 chirps in FIG. 6. In practice, however, a sequence may contain considerably more chirps, for example 128 or 256 chirps. A number that corresponds to a power of two makes it possible to use efficient FFT (fast Fourier transform) algorithms in the subsequent digital signal processing (for example in range Doppler analysis). There may be a pause between the individual sequences.

Figure 7:
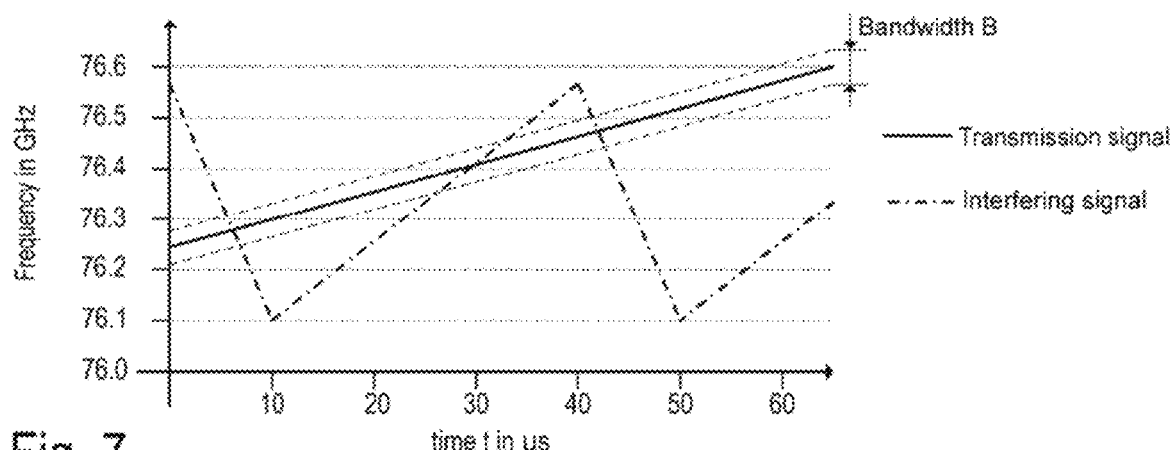
FIG. 7 shows a timing diagram of a transmission signal of a radar sensor and of a transmission signal (interfering signal), causing interference, of a further radar sensor (interferer), wherein the signal profiles (frequency over time) of these signals partly overlap.
Figure 8:
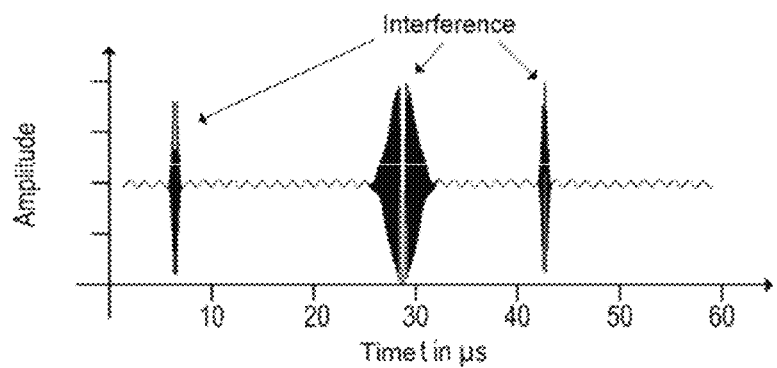
FIG. 8 shows a timing diagram of an example signal profile of a radar signal (after mixing into baseband) that contains a radar echo from a radar target and an interfering signal (interference).

FIGS. 7 and 8 illustrate, on the basis of an example, how an interferer is able to interfere with the radar echoes that are contained in the RF signal $y_{RF}(t)$ received by the radar sensor 1. FIG. 7 shows a graph (frequency over time) of a chirp, emitted by the radar sensor 1, with a chirp duration of 60 µs (solid line). The start frequency of the emitted signal $s_{RF}(t)$ is approximately 76250 MHz, and the stop frequency is approximately 76600 MHz. An interfering signal $y_{RF,I}(t)$ generated by another radar sensor contains an up-chirp with a start frequency of approximately 76100 MHz, a stop frequency of approximately 76580 MHz and a chirp duration of 30 µs and a subsequent down-chirp that starts at the stop frequency of the preceding chirp and ends at the start frequency of the preceding chirp and has a chirp duration of 10 µs (dot-and-dash line). The bandwidth B of the baseband signal of the radar sensor is defined essentially by the baseband signal processing chain 20 and is indicated by the dashed lines in FIG. 7. FIG. 8 shows an example signal profile of the (pre-processed) baseband signal y(t) of the radar sensor 1. It is able to be seen that the signal components caused by the interference in that time interval at which the frequency of the interfering signal lies within the bandwidth B of the radar sensor have a significant amplitude (see FIGS. 7 and 8). In the present example, the interference occurs three times during the chirp duration of 60 µs, specifically at approximately 7 µs, 28 µs and 42 µs. As mentioned, the power of the interfering signal may be higher than the power of the radar echo from real targets. The interfering signals and the transmission signal of the radar sensor 1 under consideration are furthermore uncorrelated (other than exceptions that are not considered here), for which reason the interference may be considered to be noise (within the meaning of broadband interference) and thus increases the noise floor.

Figure 9:
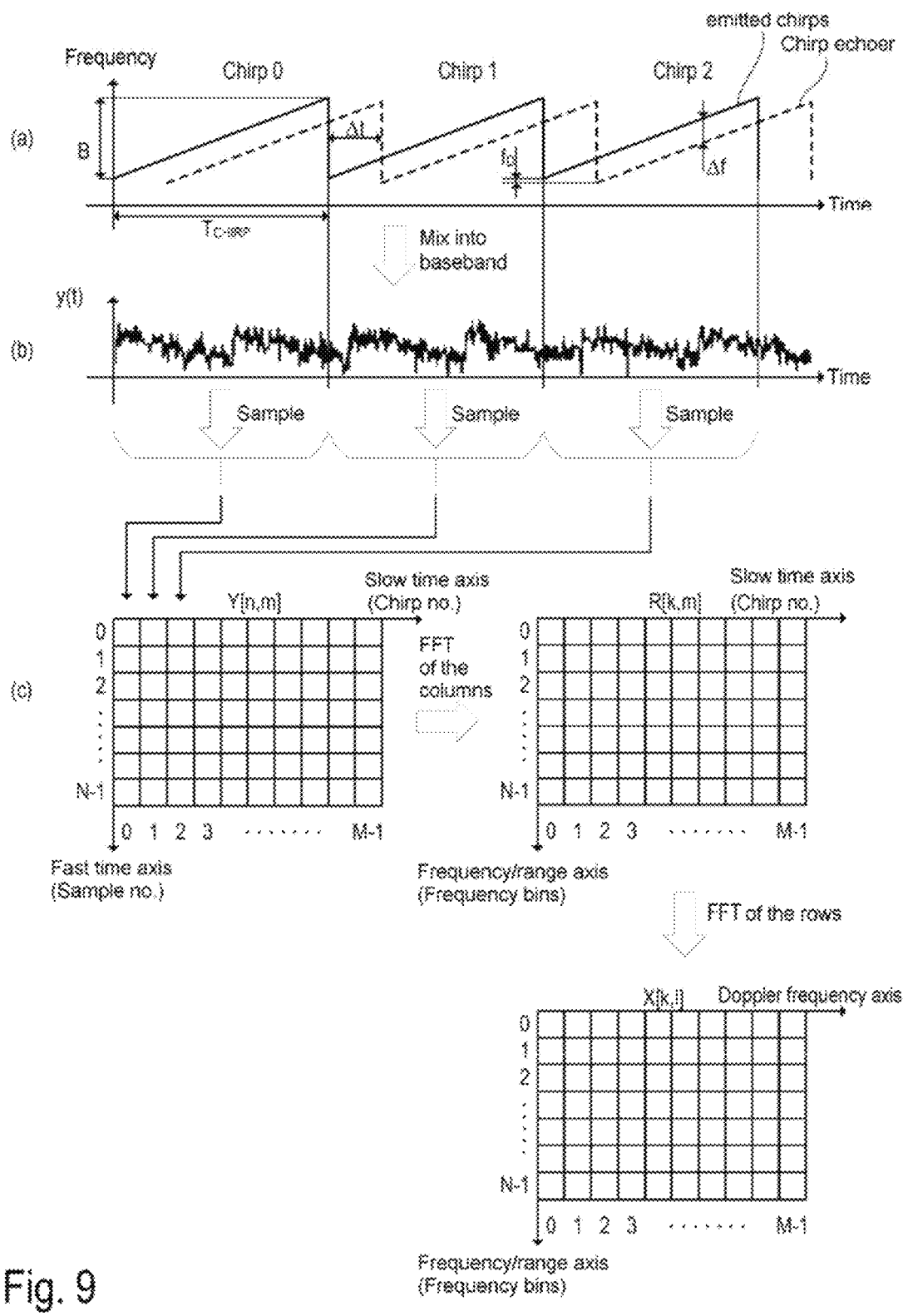
FIG. 9 illustrates, by way of example, the digital signal processing of radar signals in range Doppler analysis.

Before interfering signal suppression is discussed in more detail, a brief summary is given below of the signal processing usually performed in a radar sensor in order to detect radar targets. FIG. 9 illustrates, with reference to an example, the analog signal processing of a radar sensor as far as the digitization of the baseband signal that represents the chirp echo signals, and the subsequent digital processing. Graph (a) in FIG. 9 shows part of a chirp sequence that comprises M linear chirps. The solid line represents the signal profile (waveform, frequency over time) of the outgoing RF radar signal $s_{RF}(t)$, and the dashed line represents the corresponding signal profile of the arriving (and pre-amplified) RF radar signal $y_{RF}(t)$ that (when present) contains the chirp echoes. According to graph (a) in FIG. 9, the frequency of the outgoing radar signal increases linearly, starting at a start frequency $f_{START}$, up to a stop frequency $f_{STOP}$ (chirp no. 0) and then drops back to the start frequency $f_{START}$, increases again up to the stop frequency $f_{STOP}$ (chirp no. 1), and so on.

As explained above with reference to FIG. 6, a chirp sequence comprises a plurality of chirps; in the present case, the number of chirps in a sequence is denoted M. Depending on the application, a sequence may also contain chirps with different parameters (start and stop frequency, duration and modulation pause). During a modulation pause between two successive chirps, the frequency may for example be the same as the stop frequency of the previous chirp or the start frequency of the following chirp (or the same as another frequency). The chirp duration may be in the range from a few microseconds up to a few milliseconds, for example in the range from 20 µs to 2 ms. The actual values may also be greater or smaller depending on the application. The number M of chirps in a sequence may correspond to a power of two, for example M=256.

The arriving RF radar signal $y_{RF}(t)$ (that is to say received by the RX antenna) lags the outgoing RF radar signal $s_{RF}(t)$ (that is to say emitted by the TX antenna) by a time difference Δt. This time difference Δt corresponds to the signal propagation time from the TX antenna to the radar target and back to the RX antenna and is also referred to as round trip delay time (RTDT). The distance $d_{T_i}$ of a radar target $T_i$ from the radar sensor is $d_{T_i}=c·Δt/2$, that is to say the speed of light c times half the time difference Δt. As is able to be seen in graph (a) in FIG. 9, the time difference Δt results in a corresponding frequency difference Δf. This frequency difference Δf may be determined by mixing the arriving (and possibly pre-amplified) radar signal $y_{RF}(t)$ with the LO signal $s_{LO}(t)$ of the radar sensor (see FIG. 5, mixer 104), digitizing the resulting baseband signal y(t) and then performing digital spectral analysis. The frequency difference Δf then appears in the spectrum of the digitized baseband signal y[n] as what is called the beat frequency. If linear chirps are used, the time difference Δt may be calculated according to Δt=Δf/k, wherein the factor k denotes the gradient (hertz per second) of the frequency ramp that is able to be calculated according to $k=B/T_{CHIRP}$, wherein B is the bandwidth of a chirp ($B=|f_{STOP}-f_{START}|$). With regard to the above explanations, it follows, for the sought distance $d_{T_i}$ of the target $T_i$:

$$d_{T_i}=c·Δt/2=c·Δf·T_{CHIRP}/(2B) \qquad (4)$$

Although the basic functional principle of an FMCW radar sensor has been summarized above, it is noted that more sophisticated signal processing is usually applied in practice. By way of example, an additional Doppler shift $f_D$ of the arriving signal caused by the Doppler effect may influence the distance measurement, this adding the Doppler shift $f_D$ to the frequency difference Δf explained above. Depending on the application, the Doppler shift may be estimated/calculated from the outgoing and arriving radar signals and be taken into consideration in the measurement, whereas the Doppler shift may be negligible for the distance measurement in some applications. This may for example be the case when the chirp duration is high and the speed of the target is low, such that the frequency difference Δf is large in comparison with the Doppler shift $f_D$. In some radar systems, the Doppler shift may be eliminated by determining the distance based on an up-chirp and a down-chirp in the distance measurement. In theory, the actual distance $d_T$ may be calculated as the average of the distance values obtained from a measurement using up-chirps and a further measurement using down-chirps. The Doppler shift is eliminated through the averaging.

One example of a signal processing technique for processing FMCW signals involves calculating what are known as range Doppler maps, which are also referred to as range Doppler images. In general, FMCW radar sensors determine the target information (that is to say distance, speed, DoA) by emitting a sequence of chirps (see FIG. 9, graph (a)) and mixing the (delayed) echoes from the radar targets with a "copy" of the emitted signal (cf. FIG. 5, mixer 104). The resulting baseband signal y(t) is illustrated in graph (b) in FIG. 9. This baseband signal y(t), and therefore also the digitized baseband signal y[n] (digital radar signal), may be divided into a plurality of segments, wherein each segment of the digital radar signal y[n] is associated with a particular chirp of the chirp sequence.

The target information may be extracted from the spectrum of the segments of the digital radar signal y[n], containing the chirp echoes generated by one or more radar targets. A range Doppler map is for example obtained, as explained in more detail below, by way of a two-stage Fourier transformation. Range Doppler maps may be used as a basis for various methods for detecting, identifying, and classifying radar targets. The result of the first Fourier transformation stage is referred to as a range map. The methods described herein for interfering signal suppression may be performed in the segments of the digital radar signal and/or their spectra that are contained in such a range map.

In the examples illustrated here, the calculations to determine the range Doppler maps are performed by a digital computing unit, such as for example a signal processor (cf. FIG. 5, a computing unit 40, such as digital signal processor (DSP) 40). In other example implementations, in addition or as an alternative to a signal processor, other computing units may also be used in order to perform the calculations. Depending on the implementation, the calculations may be performed by different software and hardware entities or combinations thereof. The term computing unit may typically be understood to mean any combination of software and hardware that is capable of and designed to perform the calculations that are described in connection with the example implementations explained here.

According to one example implementation, the calculation of a range Doppler map involves two stages, wherein a plurality of Fourier transformations are calculated in each stage (for example by way of an FFT algorithm). According to the present example, the baseband signal y(t) (cf. FIG. 5) is sampled such that N×M sampled values (samples), that is to say M segments each containing N samples, are obtained for a chirp sequence containing M chirps. That is to say, the sampling time interval $T_{SAMPLE}$ is selected such that each of the M segments (chirp echoes in baseband) is represented by a sequence of N samples. As illustrated in diagram (c) in FIG. 9, these M segments with in each case N samples may be arranged in a two-dimensional array Y[n,m] (radar data array). Each column of the array Y[n,m] represents one of the M segments under consideration of the baseband signal y(t), and the nth row of the array Y[n,m] contains the nth sample of the M chirps. The row index n (n=0, 1, ... N−1) may thus be considered to be a discrete time $n \cdot T_{SAMPLE}$ (within a chirp) on a "fast" time axis. Similarly, the column index m (m=0, 1, ... M−1) may be considered to be a discrete time $m \cdot T_{CHIRP}$ on a "slow" time axis. The column index m corresponds to the number of the chirp in a chirp sequence.

In a first stage, a first FFT (usually referred to as range FFT) is applied to each chirp. The Fourier transformation is calculated for each column of the array Y[n,m]. In other words, the array Y[n,m] is Fourier-transformed along the fast time axis, and a two-dimensional array Y[n,m] of spectra, referred to as range map, is obtained as a result, wherein each of the M columns of the range map in each case contains N (complex-value) spectral values. By virtue of the Fourier transformation, the "fast" time axis becomes the frequency axis; the row index k of the range map R[k,m] corresponds to a discrete frequency and is therefore also referred to as frequency bin. Each discrete frequency corresponds to a distance according to equation 4, for which reason the frequency axis is also referred to as distance axis (or range axis).

The range map R[k,m] is illustrated in diagram (c) in FIG. 9. A radar echo caused by a radar target results in a local maximum (peak) at a particular frequency index/frequency bin. This local maximum usually appears in all of the columns of the range map R[k,m], that is to say in the spectra of all of the segments under consideration of the baseband signal y[n] that are able to be associated with the chirps of a chirp sequence. As mentioned, the associated frequency index k (for example in accordance with equation 4) may be converted into a distance value.

In a second stage, a second FFT (usually referred to as Doppler FFT) is applied to each of the N rows of the range map R[k,m] (k=0, ... , N−1). Each row of the range map R[k,m] contains M spectral values of a particular frequency bin, wherein each frequency bin corresponds to a particular distance $d_{T_i}$ of a particular radar target $T_i$. The Fourier transformation of the spectral values in a particular frequency bin (able to be associated with a radar target) makes it possible to determine the associated Doppler shift $f_D$ that corresponds to a speed of the radar target. In other words, the two-dimensional array R[k,m] (the range map) is Fourier-transformed in rows, that is to say along the "slow" time axis. The resulting Fourier transforms again form an array containing N×M spectral values, which is referred to as range Doppler map X[k,l] (k=0, ... , N−1 and l=0, ... , M−1). The "slow" time axis becomes the Doppler frequency axis through the second FFT. The associated discrete Doppler frequency values each correspond to a particular speed. The Doppler frequency axis may accordingly be converted into a speed axis. In the examples described here, the dimensions of the matrices Y[n,m], R[k,m] and X[k,l] are equal to N×M, wherein N denotes the number of discrete frequency values (also referred to as frequency bins or bins) on the range axis and M denotes the number of discrete Doppler frequency values on the Doppler axis. This is however not necessarily the case. Depending on the implementation, the matrix Y[n,m] may be expanded (virtually) by way of zero padding, such that the range map R[k,m] has a dimension N'×M, where N'>N. It is mentioned for the sake of completeness that it may also be the case that N>N', for example if particular distance ranges are not required. The same applies analogously to the parameter M (number of signal segments/chirps in a sequence) with regard to the speed.

Each local maximum (each peak) in the range Doppler map X[k,l] indicates a potential radar target. The row index k (on the range axis) associated with a local maximum represents the distance of the target, and the column index l (on the speed axis) associated with the local maximum represents the speed of the target.

Several variants of a concept for detecting and/or reducing (for example interference-induced) disturbances contained in the measured values contained in a radar data array Y[n,m] are described below. The mth column of a radar data array Y[n,m]—that is to say the mth segment of a sequence of M segments of digital radar signal—is denoted $y_m[n]$ below. Each signal segment $y_m[n]$ may be associated with a particular chirp of a particular chirp sequence of the emitted RF radar signal $s_{RF}(t)$. FIGS. 10A-10D illustrates various example structures of suppressing/filtering or detecting interference-induced (and other) disturbances using artificial neural networks (ANNs).

The example shown in FIG. 10A relates to the detection of signal segments $y_m[n]$ that are impacted by interference using one or more artificial neural networks, and the subsequent digital signal processing in order to detect radar targets. The functional blocks illustrated in FIGS. 10A-10D may be implemented at least partly in software that is executed by one or more processors. These processors may for example be contained in the computing unit 40 and/or the controller 50 (cf. FIG. 3). The functions provided by the functional blocks illustrated in FIGS. 10A-10D may also however be implemented at least partly by way of hard-wired ALUs (arithmetic logic units). By way of example, fast Fourier transform (FFT) algorithms are able to be implemented comparatively easily by way of hardware. In particular neural networks may be implemented by way of circuits (for example neuromorphic circuits) and processors (for example neuromorphic/neurosynaptic processors) that are specifically suitable for this purpose. Processors with hardware accelerators for artificial neural networks (within the meaning of fast vector signal processors having a high number of parallel multiplier-accumulate (MAC) units) likewise exist.

Figure 13:
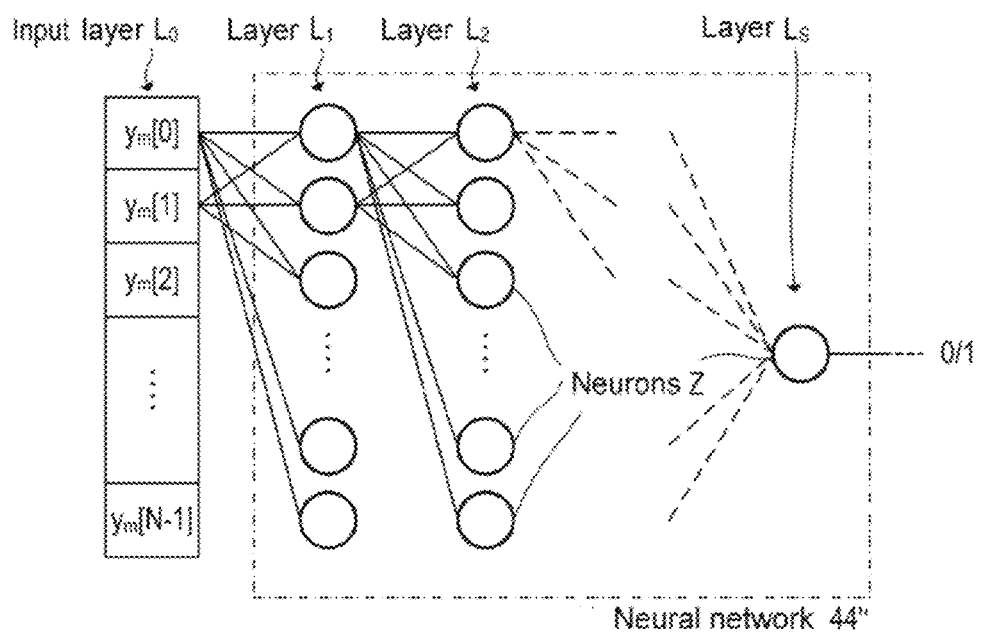
FIG. 13 illustrates a further example according to which signal segments of a received radar signal that are disturbed by interference are detected by way of a neural network.

According to FIG. 10A, the M signal segments $y_m[n]$ (m=0, ..., M−1, n=0, ..., N−1) are Fourier-transformed twice (range FFT 41, Doppler FFT block 42) in order to obtain a range Doppler map X[k,l]. The signal segments $y_m[n]$ are furthermore fed to the artificial neural network 44. The input of the artificial neural network 44 thus obtains, as input vector, the N sampled values $y_m[0]$ to $y_m[N-1]$ for each received signal segment m (that is associated with the respective chirp). The artificial neural network is trained to detect whether the respective signal segment or some of the samples contained therein are impacted by interference. The result of this detection is a yes/no decision (binary result) either for the respective signal segment on its own or for each individual sample contained therein. FIGS. 11 and 13 show examples of suitable neural network structures in more detail. The target detection (functional block 43) may then be performed based on the calculated range Doppler map X[k,l] and taking into consideration the output signal/the output signals from the neural network 44. In one modified example (not illustrated), the column vectors $r_m[k]$ of the range map R[l,m] are fed to the neural network 44 as input data instead of the signal segments $y_m[n]$.

The example shown in FIG. 10B relates to the reduction of interfering signal components in the signal segments $y_m[n]$ using one or more artificial neural networks, and the subsequent digital signal processing in order to detect radar targets. In this connection, the neural network 44' may be considered to be a filter that is designed to reduce or ideally to eliminate the interfering signal components that may be contained in the signal components $y_m[n]$. The desired filter characteristics may then be achieved by appropriately training the neural network 44'. The filtered signal segments (output signal from the neural network) are denoted $\hat{y}_m[n]$ in FIG. 10B. The subsequent calculation of the range FFT (block 41) and the Doppler FFT (block 42) and the target detection (block 43) is based on the filtered signal segments $\hat{y}_m[n]$ that may be combined to form a filtered radar data array $\hat{Y}[n,m]$ in which the interfering signal components have been reduced (ideally eliminated). The range FFT and Doppler FFT may be calculated in accordance with FIG. 8.

The example shown in FIG. 10C is highly similar to the previous example from FIG. 10B, apart from the fact that the artificial neural network 44" is arranged between the range FFT block 41 and the Doppler FFT block 42. The neural network 44" thus receives, as input data, not the signal segments $y_m[n]$ in the time domain, but rather in the frequency domain, that is to say the discrete spectra $r_m[k]$ that represent the columns of the range map R[k,m], that is to say $r_m[k]$ is the mth column of the range map R[k,m]. The neural network 44" delivers, as output data, the filtered spectra $\hat{r}_m[k]$, which may be combined to form a filtered range map $\hat{R}[k,m]$. In this example, the range Doppler map X[k,l] is obtained by Fourier-transforming the filtered range map $\hat{R}[k,m]$ (range FFT block 42). The target detection (functional block 43) may be performed as in the previous example.

In a further, modified example, the artificial neural network is arranged between Doppler FFT (functional block 42) and target detection (functional block 43), such that the filtering brought about by the neural network "filtering" is performed in the Doppler frequency domain. This variant is illustrated in FIG. 10D. In this implementation, the filtering is two-dimensional. By way of example, filtering with a two-dimensional filter mask (kernel) may be used in a convolutional neural network. Example implementations of this variant are described in more detail further below in connection with FIGS. 14 to 16.

FIG. 11 illustrates an example implementation of a neural network 44 as may be used for example in the example from FIG. 10A. In the present example, the digital radar signal of each RX channel is processed in segments. That is to say, a signal segment $y_m[n]$ (that is to say the mth column of the radar data array Y[n,m]) may be considered to be a vector of input data of the neural network 44, wherein the vector has N values and may be associated with the sampled values of a particular chirp of the emitted RF chirp sequence. The input vector $y_m[n]$ at the same time forms the input layer $L_0$ of the neural network 44. The neural network generally has a plurality of layers $L_1$ to $L_S$, wherein the last layer $L_S$ is referred to as output layer that delivers the output data. In the present example, these output data are N binary (Boolean) values of an output vector that indicate whether the corresponding values of the input vector are impacted by noise or interference-induced disturbances.

According to the structure, shown in FIG. 11, of a neural network, each of the layers $L_1$ to $L_S$ has N neurons, wherein the output value $L_s[n]$ of the nth neuron of the sth layer may be determined as follows:

$$L_s[n] = \varphi\left(\sum_{N-1}^{i=0} w_{s,n}[i] \cdot L_{s-1}[i]\right), \text{ for } s = 1, \ldots S. \quad (5)$$

The function $\varphi(\cdot)$ is usually called activation function, which is typically nonlinear. In other words, each neuron of a layer of the neural network determines a weighted sum of the output values from the previous layer and applies the activation function $\varphi(\cdot)$ to this weighted sum. In above equation (5), the weighting factors of the nth neuron in the sth layer Ls are denoted $w_{s,n}[i]$, wherein the index i (i=0, ..., N−1) denotes the associated input value $L_{s-1}[i]$ that is delivered as output value by the previous layer. As mentioned, the layer $L_0$ denotes the input data vector $y_m[n]$ (where n=0, ..., N−1).

The weighting factors $w_{s,n}[i]$ are determined by training the neural network. In one example implementation, the neural network is what is known as a convolutional neural network in which the output value $L_s[n]$ of a neuron does not depend on all of the output values $L_{s-1}[i]$, but only on the "adjacent" values. In this case, equation 5 may be modified as follows.

$$L_s[n] = \varphi\left(\sum_{i=n-1}^{n+1} w_{s,n}[i] \cdot L_{s-1}[i]\right), \text{ for } s = 1, \ldots S, \qquad (6)$$

wherein the weighting factors $w_{s,n}[-1]$ and $w_{s,n}[N]$ may be zero (that is to say the weighting factors are supplemented with zeros at the "edge"), and wherein the index n=0, . . . N−1 denotes a particular neuron in the respective layer. In this case, the weighted sum in equation 6 may also be considered to be a convolution of the output vector $L_{s-1}[i]$ of the previous layer with the kernel vector $w_{s,n}=(w_{s,n}[-1], w_{s,n}[0], w_{s,n}[1])$, and equation 6 may be written as follows:

$$L_s[n] = \varphi\left(\sum_{i=-1}^{1} w_s[i] \cdot L_{s-1}[n-i]\right) = \varphi((w_{s,n} * L_{s-1})[n]), \qquad (7)$$

wherein the operator * denotes the discrete convolution. Equations 6 and 7 relate to a special case with a kernel vector $w_s[i]$ having three elements. It is understood that kernel vectors having more than three elements may also be used. The kernel vector may also be referred to as convolution core, filter core, filter mask or simply just as kernel. In the case of a two-dimensional convolution (cf. FIG. 14), the kernel is a (two-dimensional) kernel matrix.

The activation function $\varphi(\cdot)$ is typically a nonlinear function. Different activation functions may be used depending on the application. Examples of customary activation functions are the step function, the sigmoid function or what is known as an ReLU function, wherein the abbreviation ReLU stands for rectifier linear unit. The ReLU function is usually defined as follows: ReLU(x)=max{0,x}. The step function has the value 1 if its argument (that is to say the weighted sum from equations 5 to 7) is greater than or equal to a threshold value $\theta_{s,n}$, and otherwise has the value 0.

Figure 12:
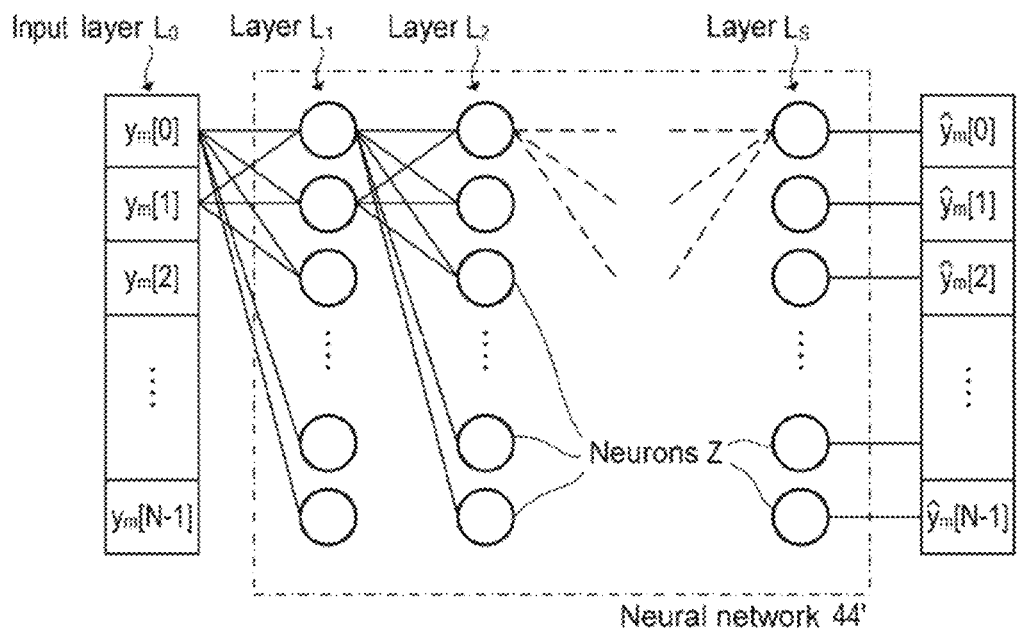
FIG. 12 illustrates a further example according to which signal segments of a received radar signal that are disturbed by interference are filtered by way of a neural network in order to reduce the interference contained in the respective signal segment.

The example from FIG. 12 is highly similar in terms of structure to the example from FIG. 11, and reference is made to the above description. Unlike in the example from FIG. 11, the neural network 44' however does not deliver any binary (Boolean) output values (yes/no decision), but rather a filtered version $\hat{y}_m[n]$ of the signal segment $y_m[n]$. A filtered radar data array Y[n,m] that may serve as a basis for a range Doppler analysis may be constructed from the filtered signal segments. The neural network 44' will in this case typically not use a step function as activation function $\varphi(\cdot)$, but rather for example an ReLU function (since the output data are not Boolean values). For the rest, the neural network 44' differs from the neural network 44 from the previous example primarily through the training data that are used, by way of which the neural network is trained in a manner known per se.

The example from FIG. 13 may be considered to be a special case of the example from FIG. 11. The neural network 44" is highly similar in terms of structure to the neural network 44 from the example from FIG. 11, wherein—unlike in FIG. 11—only one neuron that delivers a Boolean output value is used in the output layer $L_S$ of the neural network 44". A plurality of neurons (up to N neurons) are used in the other layers $L_1$ to $L_{S-1}$. Since the neuron of the output layer $L_S$ delivers a Boolean value, a step function is used as activation function $\varphi(\cdot)$ in the present example—at least in the last layer. In general, the same activation function does not have to be used in each layer of a neural network.

The examples from FIGS. 11 and 13 correspond to the signal processing structure from FIG. 10A. The example from FIG. 12 corresponds to the signal processing structure from FIG. 10B. As already mentioned, the corresponding values $r_m[k]$ of the range map R[k,m] may also be used as input data ($r_m[k]$=R[k,m]) instead of the signal segments $y_m[n]$. In this case, the signal processing structure corresponds to that from FIG. 10C. Since the range map R[k,m], and thus also the spectra $r_m[k]$, have complex values, the real part and imaginary part may be filtered using separate neural networks.

Figure 14:
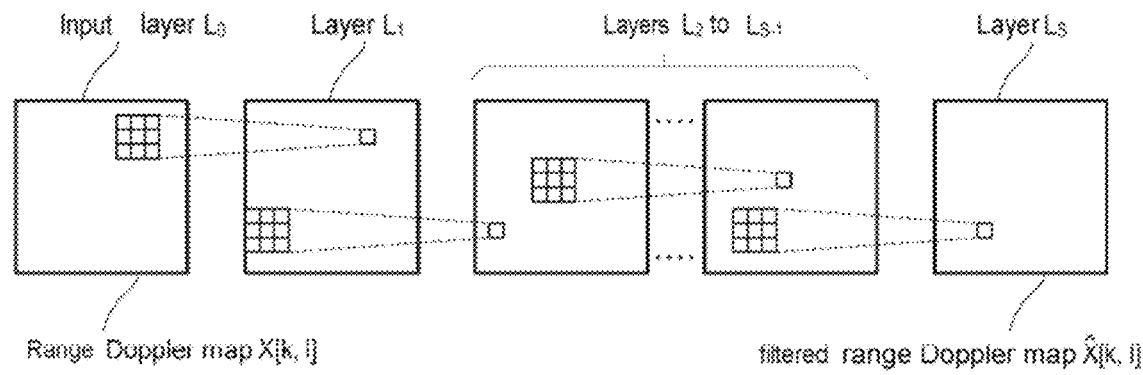
FIG. 14 illustrates a further example for filtering (denoising) a range map or a range Doppler map by way of convolutional neural networks (CNNs).

According to a further example, the filtering (denoising) is performed on the basis of the range Doppler map using a convolutional neural network (CNN), wherein a two-dimensional kernel (having for example 3×3 elements) is used. In this case, the kernel is also referred to as a convolutional matrix or mask. FIG. 14 illustrates the filtering (denoising) of a range Doppler map X[k,l], which may be considered to be a N×M-matrix (that is to say k=0, . . . , N−1 and l=0, . . . , M−1). The real part Re{X[k,l]} and imaginary part Im{X[k,l]} each form the input layers $L_0$ of a separate neural network, that is to say the real part and imaginary part are processed separately. FIG. 14 in this case essentially shows only the general principle of filtering by way of a convolutional neural network. An example implementation is explained in more detail further on with reference to FIG. 15.

The layers $L_1$ to $L_S$ of the two neural networks each contain N×M-neurons that contain the output values $L_s[k,l]$ (for k=0, . . . , N−1, l=0, . . . , M−1 and s=1, . . . , S), wherein $L_0[k,l]$=X[k,l]. The output values $L_s[k,l]$ may be calculated in the same way as equation 7 as follows:

$$L_s[k, l] = \varphi\left(\sum_{j=-1}^{1}\sum_{i=-1}^{1} w_S[i, j] \cdot L_{s-1}[k-i, l-j]\right), \qquad (8)$$

wherein the ReLU function may for example be used as activation function $\varphi(\cdot)$. The weights $w_s[i,j]$ contained in the kernel are determined by training the neural networks. In order to be able to completely calculate the convolution according to equation 8, the N×M-matrices $L_{s-1}[k,l]$ are expanded for example by way of zero padding, such that $L_{s-1}[k,l]$ are also defined for k<0 and k≥N as well as l<0 and k≥M.

In one example implementation, the values of the input layer $L_0[k,l]$ may be normalized, such that for example the average is zero and the standard deviation is one. Such normalization of the values contained in the N×M-matrix $L_0[k,l]$ may be achieved through offset compensation (such that the average is zero) and scaling (such that the standard deviation is one). That is to say, in this case the values of the input layer $L_0[k,l]$ are equal to $a \cdot (\text{Re}\{X[k,l]\} - \text{Re}\{\overline{X}\})$, wherein a is the scaling factor and $\text{Re}\{\overline{X}\}$ is the average of the real parts of the range Doppler map. The imaginary part Im{X[k,l]} may be normalized in the same way. Other types of normalization may likewise be used (for example in the interval from 0 to 1).

In the various layers of $L_1$ to $L_{S-1}$ of the neural networks, what is known as batch normalization may however be performed on the result of the convolution operation before applying the activation function $\varphi(\cdot)$. In this case, it is likewise attempted to bring the average of the output values of a layer (which are then the input values of the next layer) to zero and their standard deviation to 1. Performing batch normalization improves the stability of neural networks and may for example be taken from the publication S. Ioffe, C. Szegedy, *Batch Normalization: Accelerating Deep Network Training by Reducing Internal Covariate Shift"*, arXiv: 1502.03167v3 [cs.LG], Mar. 2, 2015.

Depending on the actual implementation, the number of layers used in the neural networks may be different. Acceptable results may be achieved in many cases with four to ten layers. In one experiment, the performance of the denoising dropped with fewer than six layers and increased considerably with more than six layers. Good results were able to be achieved using kernels of dimension 3×3 and 5×5, provided that enough (for example more than six) layers are provided in the neural network. In the case of larger kernels (for example 7×7 elements), there is the risk of the form and the extent of the detected local maxima (peaks) in the filtered range Doppler map being blurred, which may impair the quality of the detection of radar targets. Larger kernels may however be used depending on the specification of the radar system.

In the example according to FIG. 14, a range Doppler map is filtered in its entirety. As an alternative, the denoising may also be performed based on the range map. In this example, the M spectra contained in a range map R[k,m] are processed separately (and the real and imaginary part again separately). In this case, the input data are M x1-vectors and the kernel may have, for example, 25×1 elements. The convolution operation is in this case a one-dimensional operation, as already discussed above with reference to FIG. 12 (see also equation 7).

In the example from FIG. 14, the range Doppler map X[k,l] forms the input layer $L_0$ of the neural network. The range Doppler map X[k,l] typically contains N×M complex numerical values, which are the result of a two-dimensional FFT (cf. FIG. 9). The parameter M in this case denotes the number of frequency bins on the Doppler axis, and the parameter N denotes the number of frequency bins on the range axis (cf. explanations regarding FIG. 9). In the following example, the real part Re{X[k,l]} and imaginary part Im{X[k,l]} of the range Doppler map X[k,l] under consideration are considered to be separate "NN channels" (NN stands for neural network). That is to say, the input layer $L_0$ of the neural network has two NN channels, which are sometimes also referred to as "maps" (not to be confused with the range Doppler map). The output layer $L_S$ of the neural network likewise has two NN channels that represent the real part Re{X̂[k,l]} and imaginary part Im{X̂[k,l]} of the filtered range Doppler map X̂[k,l], in which noise and (for example interference-induced) disturbances are reduced (ideally eliminated). The other layers $L_1$ to $L_{S-1}$ may likewise have two or more NN channels. In the example from FIG. 15, in each case sixteen NN channels are used in the layers $L_1$ to $L_{S-1}$. The number of NN channels in the layers $L_1$ to $L_{S-1}$ is however not necessarily the same. The layers $L_1$ to $L_S$ are also referred to as convolutional layers. The NN channels of the individual layers of a neural network are not to be confused with the TX and RX channels of the RF front end of the radar system.

Figure 15:
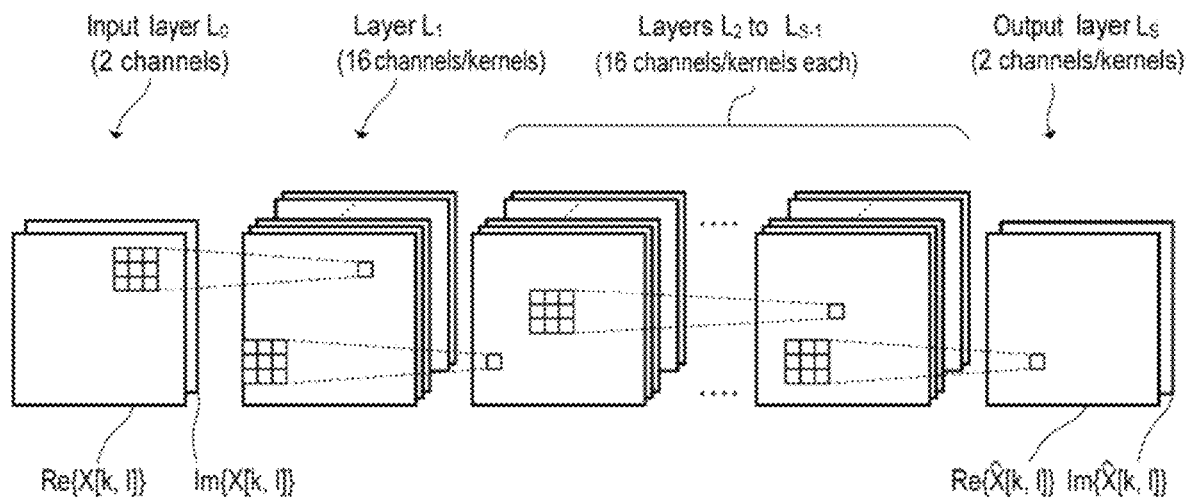
FIG. 15 illustrates an example implementation of the concept from FIG. 14 in more detail.

In the example from FIG. 15, the layer $L_1$ processes the output values of the two NN channels of the layer $L_0$ as input data. The output values of the sixteen NN channels of the layers $L_1$ to $L_{S-1}$ form the input values of the respective following layer $L_2$ to $L_S$. A kernel associated with the respective NN channel and that contains weighting factors as explained above is used in each layer $L_1$ to $L_S$ to calculate the output values of each NN channel. In the example from FIG. 15, in each case sixteen kernels are therefore used in the layers $L_1$ to $L_{S-1}$ (one kernel for each NN channel), whereas only two kernels are used in the layer $L_S$ (likewise one for each NN channel). The kernels are however not two-dimensional convolutional matrices, but rather three-dimensional arrays each containing $K_1 \times K_2 \times C_{in}$ elements. In this case, $K_1 \times K_2$ denotes the dimension of a kernel within an NN channel and $C_{in}$ denotes the number of NN channels that deliver input data. In the example illustrated in FIG. 15, the sixteen kernels of the layer $L_1$ have a dimension of 3×3×2, the sixteen kernels of the layers $L_1$ to $L_{S-1}$ have a dimension of 3×3×16, and the two kernels of the output layer $L_S$ likewise have a dimension of 3×3×16. It is understood that the numerical values that are given are merely examples. The values $K_1$ and $K_2$ are also not necessarily the same.

In the case of a plurality of NN channels, the convolution may take place in the same way as equation 8, wherein summing is additionally performed over all of the NN channels of the previous layer.

$$L_s[k, l, c] = \varphi\Big(\sum\nolimits_{u=1}^{Cin} \sum\nolimits_{j=-1}^{1} \sum\nolimits_{i=-1}^{1} w_s[i, j, u] \cdot L_{s-1}[k-i, l-j, c-u]\Big). \quad (9)$$

In above equation 9, $L_s[k,l,c]$ denotes the output values of the cth NN channel of the sth layer. Equation 9 is a generalization of equation 8, wherein the sum of u=1 to $C_{in}$ denotes the summing over all of the $C_{in}$ NN channels of the respective previous layer. For the layer $L_1$, $C_{in}$ would be equal to two (the input layer $L_0$ has two NN channels), for the layers $L_1$ to $L_S$, $C_{in}$ would be equal to sixteen in the example from FIG. 15. As mentioned, equation 9 represents the special case in which the kernels $w_s[k,l,c]$ have $3 \times 3 \times C_{in}$ elements. In other examples, more than three elements may also be used in the first two dimensions (range and Doppler dimension).

Unlike in known applications (for example in image processing in order to classify objects contained in images), the neural network in the examples described here does not necessarily end with a fully connected layer, but rather with a "normal" convolutional layer. The output layer $L_S$, unlike the layers $L_1$ to $L_{S-1}$, may use a linear activation function $\varphi(\cdot)$, for example $\varphi(a)=a$ (for any argument a). Due to the fact that precisely two kernels are used in the output layer $L_S$, two output channels each having N×M values that represent the real part and imaginary part of a filtered range Doppler map are obtained.

Unlike in known applications, such as for example in image processing in order to classify objects contained in images, pooling is not necessarily performed in the example implementations described here. Pooling generally leads to a lossy reduction in the amount of data, which may generally be undesired in radar applications. The number of output values of each NN channel of each layer is generally N×M in the example implementations described here and therefore corresponds to the number of (complex) values of the range Doppler map.

Figure 16:
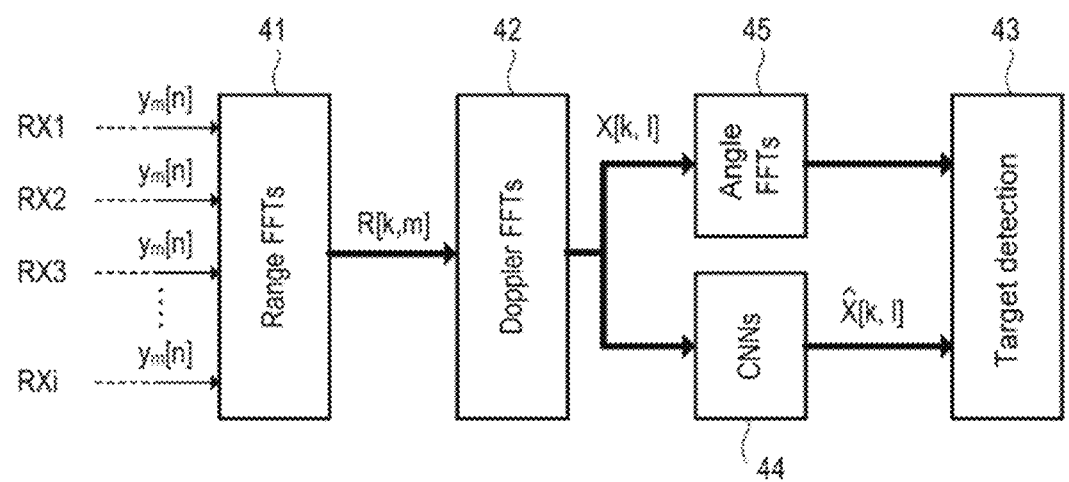
FIG. 16 illustrates, by way of example, a signal processing structure having a convolutional neural network (CNN) for filtering the range Doppler maps of a radar system and the subsequent target detection.

FIG. 16 illustrates one example of a signal processing structure within which denoising of the range Doppler maps is performed. In the illustrated example, consideration is given to a radar system with i RX channels RX1, RX2, . . . , RXi. The RX channels may also be virtual channels, that is to say channels in which each channel is in each case associated with a particular combination of transmission and reception antenna, for example in an MIMO arrangement. Each channel delivers a digital radar signal y[n] that is processed in segments, wherein each signal segment 1 $y_m[n]$ may be associated with a particular chirp of an emitted RF chirp sequence. In a first step, a range FFT is calculated for each channel (functional block 41), such that a range map R[k,m] is obtained for each channel (see also FIG. 9). In a second step, a Doppler FFT is calculated for each channel (functional block 42), such that a range Doppler map X[k,l] is obtained for each channel. The range Doppler maps are fed (sequentially or at least partly in parallel) to neural networks (functional block 44), wherein the real and imaginary part are each processed separately. The neural networks may be convolutional neural networks, as described above with reference to FIG. 14. The functional block 44 delivers a filtered range Doppler map $\hat{X}[k,l]$ for each channel as output data. In order also to be able to determine the direction of arrival (DoA) of the RF radar signals, angle FFTs are also calculated based on the unfiltered range Doppler map X[k,l] in a manner known per se. The target detection (functional block 43) is then performed based on the filtered range Doppler maps $\hat{X}[k,l]$. As an alternative, the angle FFTs may also be calculated on the basis of the filtered range Doppler maps $\hat{X}[k,l]$.

Calculating the angle FFTs on the basis of the unfiltered range Doppler maps X[k,l] may however offer the advantage that, although the position and speed may still be determined on the basis of the filtered range Doppler maps $\hat{X}[k,l]$ (which significantly increases reliability and accuracy), the unfiltered data are used when determining the direction of arrival (DoA), such that any damage/change in the phases of the values contained in the range Doppler maps X[k,l] caused by the neural network has no influence.

The training data for training the neural networks may be determined for example by way of simulation. That is to say, digital radar data that are overlaid with noise and interfering signals (interference) are generated by way of a signal model using simulation software that is executed for example on a computer. These data determined by way of simulation are fed to the neural networks and the resulting output data may be compared with the "ideal" radar data (without noise and interference). The weight factors in the kernels are adapted during training of the neural networks such that the deviations of the filtered radar data from the ideal data are as small as possible. The deviation may be evaluated for example by way of the least squares method. This evaluation function is usually referred to as object loss function. Training neural networks is known per se and is therefore not explained in more detail here. By way of example, the neural network may be trained by way of the ADAM algorithm that is known per se.

In practice, it can be advantageous to improve resource-efficiency (e.g., reduce an amount of memory, power, and/or computing resources needed for processing a signal) of a neural network to, for example, enable deployment of the neural network on embedded hardware. However, a neural network may have a large number (e.g., thousands, hundreds of thousands, millions, or the like) of weighting factors, and these weighting factors need to be stored in memory. Additional memory is needed for neural network activations when generating predictions based on inputs to the neural network. Typically, the weighting factors are 32-bit floating point numbers. Thus, a neural network with approximately 1.5 million weighting factors would require approximately 6 megabytes of memory storage. During the processing of inputs to the neural network, as noted above, additional memory is needed for the activations which are forward propagated through the neural network. The amount of additional memory may be, for example, on the order of tens of megabytes (e.g., 20 megabytes or more). Furthermore, an amount of time to process an input largely depends on a data type of the weighting factors, as well as the processing operations of the neural network. The most expensive operation in terms of run-time is the loading of data from off-chip memory and, therefore, keeping the neural network relatively small and storing as many weighting factors and activations as possible in the comparatively faster on-chip memory is desirable. Additionally, a reduction of processing complexity can be achieved when advantageous weighting factor values are chosen. For example, when ternary weights are used in a convolutional neural network (e.g., weighting factors with values of $\{-1, 0, 1\}$), multiplications can be substituted with simple bit operations (sign-bit negation or a zero result).

As described in further detail below, in some implementations, weight quantization may be applied to a neural network described herein in order to reduce memory and computational requirements. Weight quantization may be used for a neural network that performs operations associated with interference and/or noise suppression as described herein, in particular for an FMCW radar system. In some implementations, the reduction of memory requirements and processing operations enables the use of these models on embedded hardware. In some cases, a radar sensor or chip may provide for integrated processing that includes hardware accelerators for neural networks, which may enable use of neural networks for tasks that come early in a signal processing chain, such as interference suppression and/or noise suppression.

In some implementations, as described above, a radar receiver (e.g., included in a radar system) may be configured to receive an RF radar signal and generate, based on the RF radar signal, a digital signal including a plurality of signal segments. Further, in some implementations, the receiver may include a neural network comprising a plurality of layers to process the plurality of signal segments, where each layer of the plurality of layers has one or more neurons, as described above. In some implementations, weight quantization may be applied to the neural network. This means that weighting factors used by the neural network may have values selected from a predetermined set of discrete values and, therefore, that the possible values for the weighting factors are limited to the values in the predetermined set of values. In such a case, in some implementations, the plurality of layers of the neural network may be configured to process the plurality of signal segments using the weighting factors that have values selected from the predetermined set of discrete values. Here, the use of the quantized weights (i.e., the weighting factors having values selected from the predetermined set of discrete values) significantly reduces an amount of required memory (e.g., since a single bit may store the value for each weighting factor) and reduces computational complexity (e.g., since multiplications can be substituted with simple bit operations such as sign-bit negation or a zero result).

Similarly, in some implementations, a radar receiver may be configured to receive an RF radar signal and generate a dataset including a set of digital values, the dataset being associated with one or more frequency-modulated chirps, as described above. As further described above, the radar receiver may in some implementations include a convolutional neural network to filter the dataset to reduce an interfering signal included in the dataset. In such a case, in some implementations, the convolutional neural network may be configured to filter the dataset using quantized weights (i.e., weighting factors having values from a predetermined set of discrete values). Here again, the use of the quantized weights significantly reduces an amount of required memory and reduces computational complexity.

In some implementations, the weighting factors have values selected exclusively from the predetermined set of discrete values. That is, the predetermined set of discrete values may define all possible values for each weighting factor. In some implementations, the predetermined set of discrete values may be, for example, a ternary set of values, a quaternary set of values, a quinary set of values, or the like. As a particular example, the predetermined set of discrete values may be a ternary set of values, and may include values of −1, 0, and 1. In some implementations, the predetermined set of discrete values includes not more than 65537 values (corresponding to $2^{16}$ and the zero value). For example, the predetermined set of discrete values may include 257 values (corresponding to $2^8$ and the zero value) or less.

In some implementations, the neural network that uses quantized weighting factors may be trained using weight distributions over the predetermined set of discrete values, or may be trained based on quantizing real-valued auxiliary weighting factors to have values from the predetermined set of discrete values, as described in further detail below. Thus instead of having weighting factors that are allowed to be a continuous value and can be every value, each weighting factor is allowed to take a value only from the set of discrete values. In some embodiments, the discrete values may be exclusively integer numbers including zero and negative integer numbers. In other embodiments, the set of discrete values may include integer numbers and fractional numbers or only fractional numbers. In the set of discrete values, a difference between nearest values may have a same (e.g. 1 for all) or the difference between nearest values of the set may be different (e.g. 1 for a first difference value between two neighbor values and 2 for a second difference value between two other neighbor values).

Real-valued neural networks are typically trained using gradient-based optimization algorithms based on a backpropagation algorithm. These methods cannot be applied to discrete-valued weighting factors or to piece-wise constant activation functions because the gradient is zero at nearly all points. Quantization can be achieved by, for example, (1) quantizing previously trained real-valued neural networks in a more or less heuristic manner, (2) performing quantization aware training using real-valued auxiliary weighting factors and using a straight through estimator for the backward pass of the quantization function, or (3) training weight distributions over discrete weighting factors using a Bayesian approach and choosing the most probable weighting factors of the trained neural network to obtain a discrete-valued neural network. Notably, these three approaches can be used for weight quantization of the denoising neural networks described herein.

In some implementations, as noted above, weight quantization may be achieved by training weight distributions over discrete weighting factors. According to this approach, real-valued weighting factors are replaced with distributions over discrete weighting factors.

In some implementations, to train these weight distributions, a loss function is redefined such that the expectation with respect to the distribution parameters is differentiable and is therefore usable for backpropagation. In some implementations, the distribution parameters can be learned using a gradient-based optimization algorithm, and the discrete network weighting factors are then determined using the most probable weighting factors or weighting factors sampled from optimized discrete distributions. In some implementations, the distribution parameters may be initialized from a pre-trained real-valued neural network with the same layer structure as the neural network being trained, which would have the same number of neurons/filter kernels per layer.

In some implementations, 2D convolutional layers of the neural network may include exclusively quantized weighting factors and no biases, except for the last convolutional layer, which may use real-valued biases. In some implementations, the activation function can either map to real-valued outputs (e.g., the ReLU function) or to quantized outputs (e.g., the sign function). In an implementation in which the activation function maps to quantized outputs, reparameterization should be performed after the activation function (e.g., in order to have a non-zero gradient at the activation). Conversely, in an implementation in which the activation function is real-valued, reparameterization should be performed immediately following the 2D convolutional layer. Notably, batch normalization includes real-valued parameters according to this approach. However, the inclusion of real-valued parameters in batch normalization has a relatively small effect on a required memory size since, for example, only a few parameters are required for batch normalization. The number of parameters depends on the number of activation channels (e.g., the number of filter kernels of the previous convolution operation). For a neural network with only quantized weighting factors, each composite layer may include the following individual layers and operations: dropout (optional), a 2D convolutional layer, reparameterization, batch normalization, and activation function (e.g., ReLU). For a neural network with only quantized activations or additional quantized weighting factors, each composite layer may include the following individual layers and operations: dropout (optional), 2D convolutional layer, batch normalization, activation function (e.g., sign), and reparameterization.

With respect to training, rather than using real-valued weighting factors, distributions over discrete valued weighting factors may be used. In some implementations, these distributions are assumed to be Gaussian distributed. This means that a real-valued mean and a real-valued standard deviation is used for each weighting factor (rather than a real-valued weight). In some implementations, the parameterization of the weight distributions (i.e., the number of different weighting factors and weighting factor values) can vary. In some implementations, ternary weighting factors (e.g., with values {−1, 0, 1}) may be used. In some implementations, the distribution means may be initialized using a pre-trained real-valued neural network, while the standard deviations may be initialized using small constant values.

In this case, the loss function of the neural network is the loss over the expected value of the neural network. In some implementations, because the expected loss is intractable (exponentially many terms), an approximated expected loss may be used. This approach is based on the central-limit theorem, which states that the sum of independent random variables tends towards a Gaussian distribution. Because a neuron of the neural network performs a sum over many random variables, the central limit theorem can be applied to approximate the neuron distribution by a Gaussian distribution. The binary distribution after the sign function is obtained by the cumulative distribution function (cdf) of a zero-mean unit-variance Gaussian, which transforms them to distributions over the activations.

In practice, this results in the example training steps described as follows. First, during the forward pass in the convolution operation, layer inputs are multiplied with the weight distributions, which transforms the layer inputs to distributions over the activations. Here, the outputs are means and standard deviations. Here, for real-valued activations, these activation distributions are transformed using a so-called local reparameterization technique (realizations sampled from the distributions) and are forward propagated normally through the rest of the layers/operations in the convolutional composite layer (e.g., batch normalization, non-zero gradient activation function, or the like). For discrete valued activations, the distributions are propagated through all layers/operations, including the activation function, to have non-zero gradients during backpropagation. Here, batch normalization is performed to normalize the distributions to approximately zero mean and unit variance. Notably, batch normalization statistics for prediction may need to be calculated after a training epoch using the quantized weighting factors, since statistics differ from the statistics of the distributions during training. Second, during the backward pass, the gradients with respect to the distribution parameters are calculated normally and the distribution parameters are updated. After training, the quantized neural network may be obtained either by sampling from the distributions or by using the most probable weighting factors.

Figure 17:
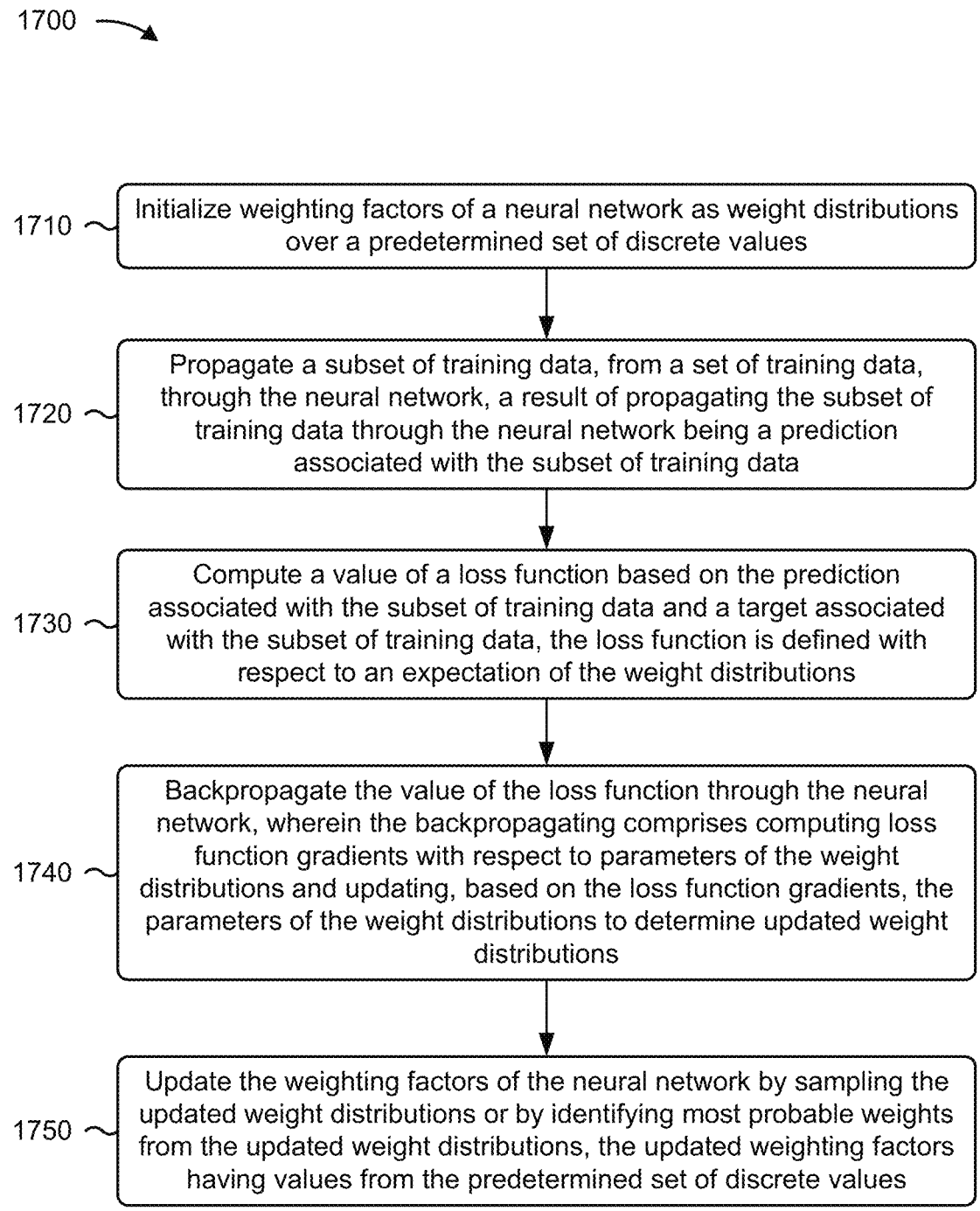
FIGS. 17-18 are flow charts of example processes for training an artificial neural network, in accordance with various aspects of the present disclosure.

FIG. 17 is a flow chart of an example process 1700 associated with training weight distributions over discrete weighting factors in the manner described above. In some implementations, as shown in FIG. 17, process 1700 may include initializing weighting factors of the neural network as weight distributions over a predetermined set of discrete values (block 1710). As further shown in FIG. 17, process 1700 may include propagating a subset of training data, from a set of training data, be propagated through the neural network (block 1720). Here, a result of propagating the subset of training data through the neural network is a prediction associated with the subset of training data. In some implementations, during the propagating of the subset of training data through the neural network, a reparameterization may be performed after an activation function is applied (e.g., when the activation function maps to quantized outputs), or before the activation function is applied (e.g., wherein the activation function maps to real-valued outputs). As further shown in FIG. 17, process 1700 may include computing a value of a loss function based on the prediction associated with the subset of training data and a target associated with the subset of training data (block 1730). In some implementations, the loss function may be defined with respect to an expectation of the weight distributions. As further shown in FIG. 17, process 1700 may include backpropagating the value of the loss function through the neural network (block 1740). Here, backpropagating the value of the loss function may include computing loss function gradients with respect to parameters of the weight distributions, and updating, based on the loss function gradients, the parameters of the weight distributions to determine updated weight distributions. As further shown in FIG. 17, process 1700 may include updating the weighting factors of the neural network by sampling the updated weight distributions or by identifying most probable weights from the updated weight distributions (block 1750). Here, the updated weighting factors have values from the predetermined set of discrete values.

Although FIG. 17 shows example blocks of process 1700, in some implementations, process 1700 may include additional blocks, fewer blocks, different blocks, or differently arranged blocks than those depicted in FIG. 17. Additionally, or alternatively, two or more of the blocks of process 1700 may be performed in parallel.

In some implementations, the training of weight distributions has the advantage of providing a possibility to sample from the weight distributions and thus obtain uncertainty estimates or an ensemble of networks for better prediction performance. In these cases, multiple models may be sampled from the weight distributions and the inputs evaluated for each of the multiple models. Here, the greater the deviation of the outputs, the higher the uncertainty of the neural network. In the case of the ensemble method, all outputs may be combined (e.g., linearly) to produce a better denoising result.

In some implementations, as noted above, weight quantization may be achieved performing quantization aware training using real-valued auxiliary weighting factors and a straight through estimator for the backward pass of the quantization function. In such a case, the neural network may use real-valued auxiliary weighting factors during training. In the forward pass, these auxiliary weighting factors are quantized with a zero-gradient quantization function (e.g., to binary weighting factors using the sign function). During the backward pass, the gradient of the quantization function is assumed to be non-zero and the gradient updates are applied to the real-valued auxiliary weighting factors. The gradient of the quantization function could be, for example, the identity (the same as before the quantization) or the gradient of a non-zero function (e.g., the tan h function). In some implementations, the same technique can be used for quantizing activations in the neural network by applying a quantization function as the activation function (e.g., sign activation) and assuming a non-zero activation function during backpropagation.

In some implementations, each composite layer includes the following individual layers and operations: dropout (optional), 2D convolutional layer, batch normalization, and activation function (e.g., ReLU, sign, or the like). Notably, no reparameterization is needed for this approach since probability distributions are not used. In some implementations, the 2D convolutional layers include exclusively quantized weighting factors and no biases, except for the last convolutional layer, which may use real-valued biases.

Figure 18:
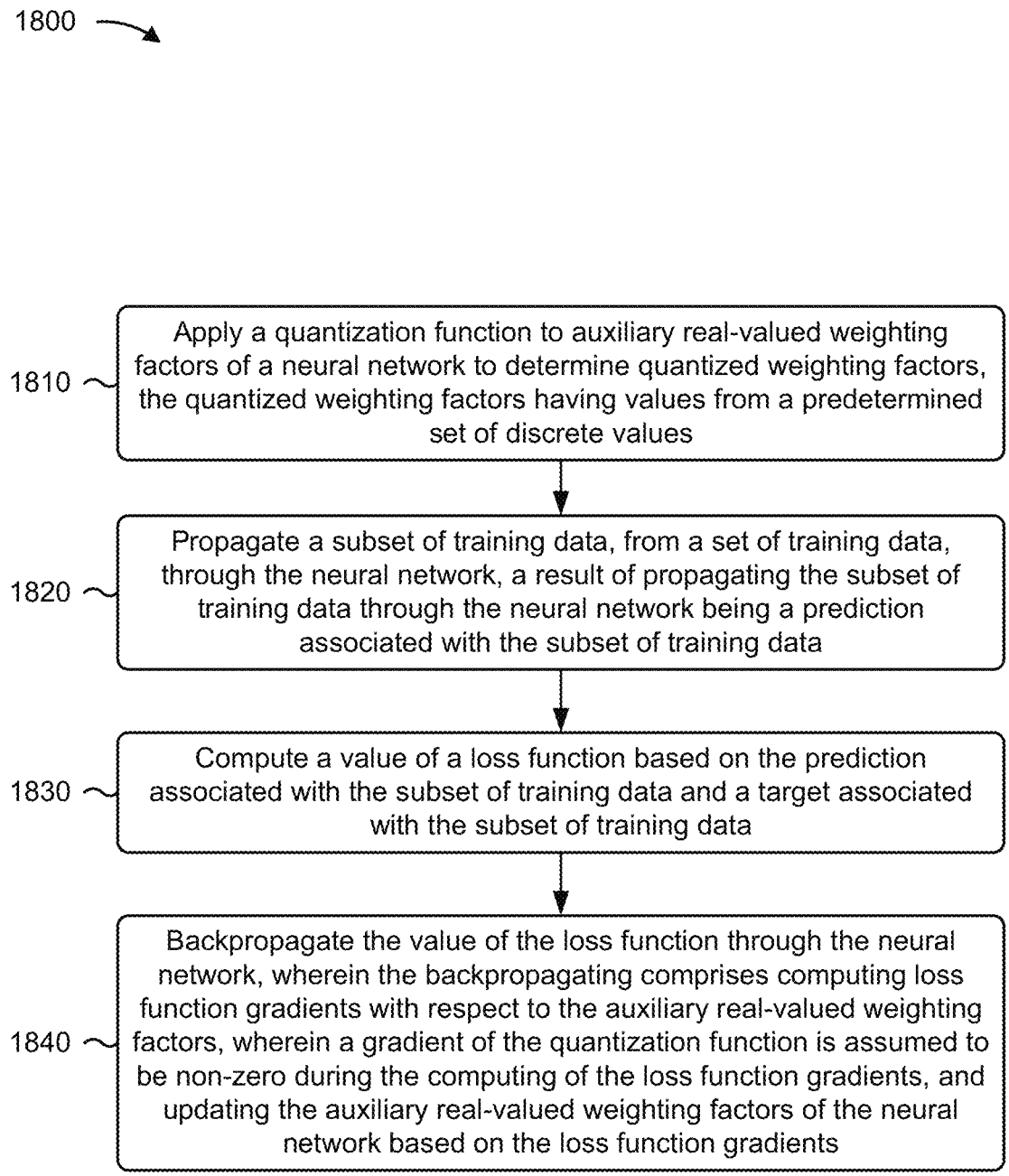

FIG. 18 is a flow chart of an example process 1800 associated with performing quantization aware training using real-valued auxiliary weighting factors and a straight through estimator for the backward pass of the quantization function in the manner described above. In some implementations, as shown in FIG. 18, process 1800 may include applying a quantization function to auxiliary real-valued weighting factors of the neural network to determine quantized weighting factors (block 1810). Here, the quantized weighting factors have values from a predetermined set of discrete values. As further shown in FIG. 18, process 1800 may include propagating a subset of training data, from a set of training data, through the neural network (block 1820). Here, a result of propagating the subset of training data through the neural network is a prediction associated with the subset of training data. As further shown in FIG. 18, process 1800 may include computing a value of a loss function based on the prediction associated with the subset of training data and a target associated with the subset of training data (block 1830). As further shown in FIG. 18, process 1800 may include backpropagating the value of the loss function through the neural network (block 1840). Here, the backpropagating may include computing loss function gradients with respect to the auxiliary real-valued weighting factors, wherein a gradient of the quantization function is assumed to be non-zero during the computing of the loss function gradients, and updating the auxiliary real-valued weighting factors of the neural network based on the loss function gradients.

Although FIG. 18 shows example blocks of process 1800, in some implementations, process 1800 may include additional blocks, fewer blocks, different blocks, or differently arranged blocks than those depicted in FIG. 18. Additionally, or alternatively, two or more of the blocks of process 1800 may be performed in parallel.

Notably, the above-described techniques utilize a real-valued approach for neural networks, whereby real- and imaginary parts of an input are fed into the neural network as separate real-valued channels, and the network learns complex relations based on training samples. However, in some implementations, a complex-valued approach can be used for the neural network, whereby one or more operations are performed using complex computation.

In some implementations, the complex-valued approach is advantageous due to the complex-valued nature of the radar signal itself. In theory, a complex-valued convolutional neural network is capable of processing complex radar spectra more easily than a real-valued convolutional neural network (which has no intuition about complex-valued numbers). Similar to local connectivity in convolution kernels, processing of complex radar spectra by a real-valued convolutional neural network could introduce an inductive bias. Therefore, a task that relies on correct phase relationships, such as radar signal processing, can be improved through use of complex operations within the convolutional neural network. Put another way, it is important that phase relationships between different channels of the data are maintained during processing by the convolutional neural network. If these phase relationships are not maintained, which may in some cases occur when using a real-valued convolutional neural network to process complex spectra, then a task that relies on these phase relationships (e.g., an angle measurement) could yield distorted and/or unreliable results.

In some implementations, a complex-valued convolutional neural network architecture may utilize a set of operations including a complex-valued convolution, a complex-valued batch normalization, and/or a complex-valued activation function. Notably, these operations are performed according to a complex computation in the complex-valued convolutional neural network.

With respect to the complex-valued convolution, a convolution kernel for a two-dimensional convolution operation may include a four dimensional tensor $W_{ijkl}$ of size $k_x \times k_y \times N_{in} \times N_{out}$. Here, $k_x$ and $k_y$ represent the spatial size of the kernel, whereas $N_{in}$ indicates the number of input filter channels and $N_{out}$ indicates the number of output filter channels. The discrete convolution for the activation $a_l^{(L+1)}$ of the next layer L+1 and filter channel l at position x,y is then defined as:

$$a_l^{(L+1)}(x, y) = \sum_{i=1}^{k_x}\sum_{j=1}^{k_y}\sum_{k=1}^{N_{in}} a_k^{(L)}(x-i+a, y-j+a) W_{ijkl}. \quad (10)$$

Considering the number of filter channels is a multiple of two, the channels can be split into two parts, a part for the real- and a part for the imaginary. Therefore, the separate kernels have size $k_x \times k_y \times N_{in}/2 \times N_{out}/2$. In complex computation, the multiplication of two complex numbers $z_1=(a+ib)$ and $z_2=(x+iy)$ results in $$z_1 \cdot z_2 = ax - by + i(bx + ay), \quad (11)$$

with $z_1, z_2 \in \mathbb{C}$ and $a, b \in \mathbb{R}$ with i being the imaginary unit. Since the convolution operator (*) is distributive, the following is obtained:

$$W*h = (A+iB)*(x+iy) = A*x - B*y + i(B*x + A*y) \quad (12)$$

when convolving the complex vector $h=x+iy$ with the complex filter matrix $W=A+iB$. In practice, this can be carried out efficiently by first concatenating the kernels $C=[A,-B]$ and $D=[B,A]$ along the k axis, leading to a tensor of size $k_x \times k_y \times N_{in} \times N_{out}/2$. To produce the real and imaginary parts using a single convolution operation, C and D can be concatenated along the l axis, resulting in a tensor of size $k_x \times k_y \times N_{in} \times N_{out}$.

With respect to complex-valued batch normalization, convolutional neural networks rely on the batch normalization operation to normalize activations and accelerate training. Since a standard formulation of batch normalization only applies to real-valued activations, complex-valued networks need a different technique. One technique for realizing a batch normalization for a complex number is to use a whitening procedure to standardize the complex numbers. According to the whitening procedure, inputs z are first whitened and then a resulting vector is scaled and shifted (e.g., as in a standard batch normalization operation (BN)) using the scaling factors matrix $\gamma$ and shift vector $\beta$, $$BN(z) = \gamma \odot (V)^{-\frac{1}{2}}(z - \mathbb{E}[z]) + \beta, \quad (13)$$

where V is a 2×2 positive (semi)-definite covariance matrix. Here, V is calculated according to $$V = \begin{pmatrix} V_{rr} & V_{ri} \\ V_{ir} & V_{ii} \end{pmatrix} = \begin{pmatrix} Cov(\mathcal{R}(z), \mathcal{R}(z)) & Cov(\mathcal{R}(z), \mathcal{I}(z)) \\ Cov(\mathcal{I}(z), \mathcal{R}(z)) & Cov(\mathcal{I}(z), \mathcal{I}(z)) \end{pmatrix} \quad (14)$$

Since the batch normalization needs the square root of the inverse of V, positive definiteness of the matrix is ensured by adding $\epsilon I$ to V (Tikhonov regularization). Therefore, the square root of the empirical covariance matrix can be calculated analytically according to $$\det(V) = V_{rr}V_{ii} - V_{ir}V_{ri}, \quad (15)$$
$$s = \pm\sqrt{\det(V)},$$
$$t = \pm\sqrt{V_{rr} + V_{ii} + 2s},$$
$$V^{\frac{1}{2}} = \frac{1}{t}(V + sI).$$

The inverse of the square root then is calculated as follows:

$$V^{-\frac{1}{2}} = \frac{1}{s}\frac{1}{t}\begin{pmatrix} V_{ii} + s & -V_{ir} \\ -V_{ri} & V_{rr} + s \end{pmatrix} \quad (16)$$

With respect to the complex-valued activation function, a complex-valued activation can act on relations between real- and imaginary parts, or on both parts separately. The modReLU activation function affects only the absolute value of the complex number. It is defined as $$\text{modReLU}(z) = \text{ReLU}(|z| + b)\exp^{i\theta_z}, \quad (17)$$

where $\theta_z$ is the phase of z, and b is a learnable parameter. The complex ReLU (CReLU) function is an activation function that uses the ReLU operation on the real- and imaginary parts separately.

$$\mathbb{C}\text{ReLU}(z) = \text{ReLU}(\Re(z)) + i\text{ReLU}(\Im(z)). \quad (18)$$

In some implementations, a complex-valued convolutional neural network architecture for interference mitigation and denoising of a radar signal may be similar to that of the real-valued approach described above. For example, a complex-valued convolutional neural network may be used for denoising range-Doppler maps. These denoised range-Doppler maps can then be used for further processing (e.g., estimating an angle-of-arrival map from signals received by multiple antennas). For purposes of an example, a complex-valued convolutional neural network with three layers is used for range-Doppler denoising in the description below. However, the complex-valued convolutional neural network can generally be used for all application cases described herein.

In some implementations, the complex-valued convolutional neural network is fully complex in every layer, meaning that all operations are carried out using complex computations such as those described above. In some implementations, an input for the complex-valued convolutional neural network (e.g., a noisy range-Doppler map) is a complex-valued two-dimensional matrix. In some implementations, this complex-valued matrix can be represented as a three dimensional tensor of size $C \times N_s \times N_r$, with $N_s$ and $N_r$ being the height and width of the map and C being the real- and imaginary parts of the complex spectra.

Figure 19:
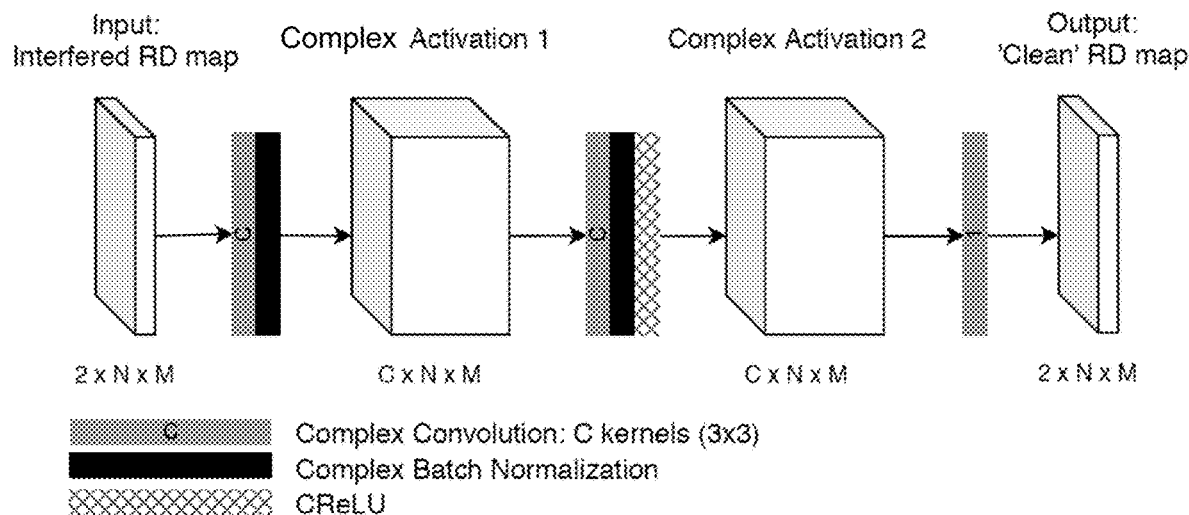
FIG. 19 is a diagram illustrating an example of a complex-valued convolutional neural network architecture, in accordance with various aspects of the present disclosure.

FIG. 19 is a diagram illustrating a complex-valued convolutional neural network architecture for denoising the angle-Doppler map according to a three layer convolutional neural network. In some implementations, as illustrated in FIG. 19, the three layers of the complex-valued convolutional neural network are constructed as follows:

1. A first complex-valued layer to perform a complex-valued convolution followed by an execution of a CReLU non-linearity function;
2. A second complex-valued layer to perform a complex-valued convolution, a complex-valued batch normalization, and an execution of a CReLU non-linearity function; and
3. A third complex-valued layer to perform a complex-valued convolution, a result of which is an output of the complex-valued convolutional neural network.

As indicated above, FIG. 19 is provided as an example. Other examples may differ from what is described with regard to FIG. 19.

With respect to training the complex-valued convolutional neural network, raw data is preprocessed into range-Doppler maps. Then the data is scaled to zero-mean and unit-variance. Interfered data is used as input while clean data is used as a learning target. The ADAM optimization algorithm is used for training in some implementations. In some implementations, the mean squared error (MSE) is used as an objective loss function of the real- and imaginary-parts. Performance of the complex-valued convolutional neural network can be tested via simulated data and real measurement data mixed with simulated interference. Data pairs can be used to train the complex-valued convolutional neural network such that the complex-valued convolutional neural network is capable of reconstructing an original signal based on the interfered and noisy data. In some implementations, to compute an angle-of-arrival map, multiple range-Doppler maps from different antennas are denoised and subsequently combined.

Figure 20:
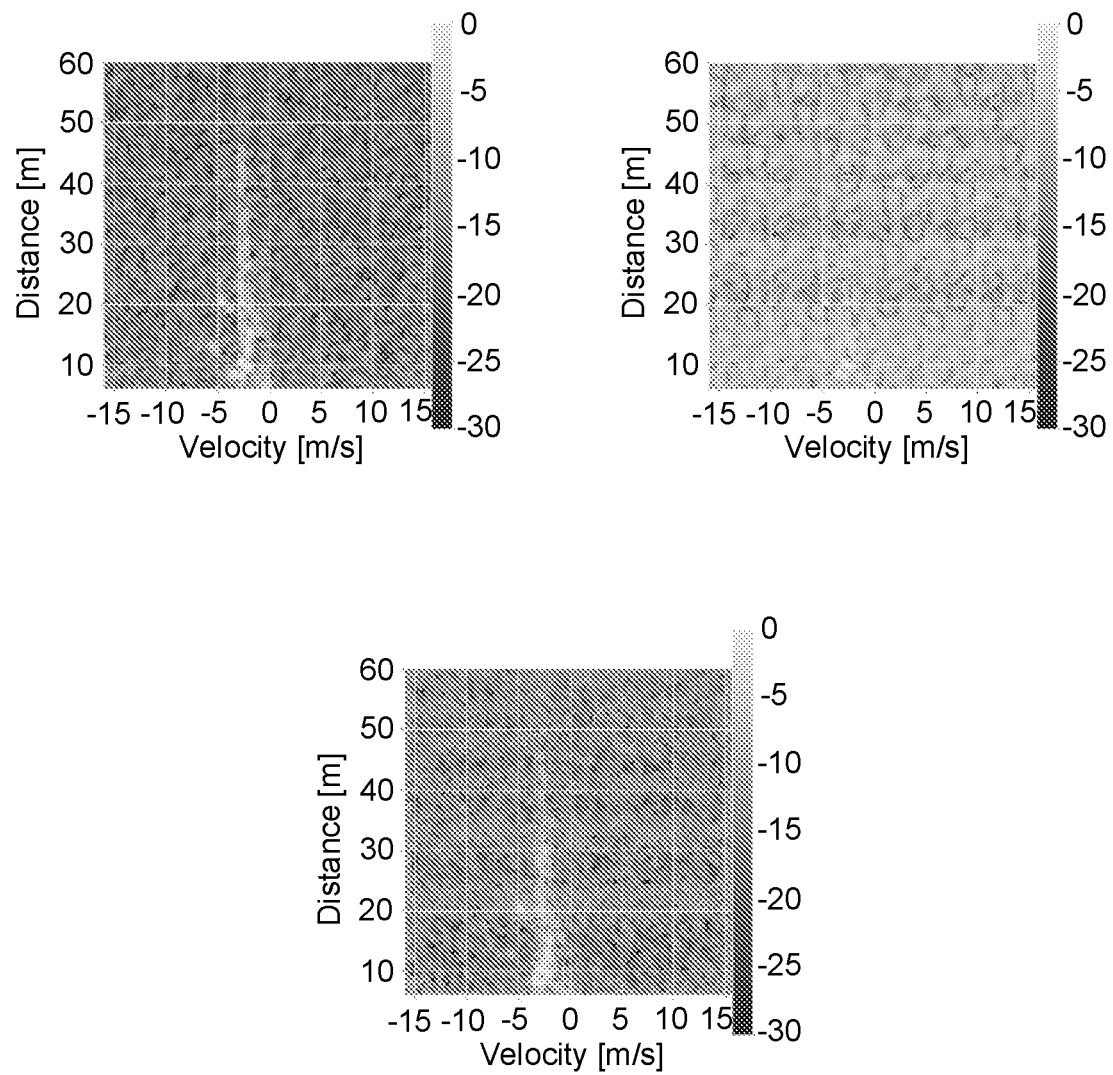
FIG. 20 is a diagram illustrating an example of result of denoising using a complex-valued convolutional neural network, in accordance with various aspects of the present disclosure.

FIG. 20 is a diagram illustrating an example of a range-Doppler map of a measurement without interference (shown in the left image in FIG. 20), the range-Doppler map with simulated interference (shown in the middle image in FIG. 20), and a result of denoising using a complex-valued convolutional neural network (shown in the right image in FIG. 20). The complex-valued convolutional neural network used for the evaluation shown in FIG. 20 is a three layer complex-valued convolutional neural network as described above, with convolutions using 3×3 kernels having 8, 4, 1 complex kernel filters equivalent to 16, 8, 2 real filters. Further, the CReLU activation functions are used for the first two layers of the complex-valued convolutional neural network, and inputs with 96 range cells×96 Doppler cells are used.

As indicated above, FIG. 20 is provided as an example. Other examples may differ from what is described with regard to FIG. 20.

In some implementations, a radar device includes a neural network (e.g., a convolutional neural network) comprising a plurality of layers, where at least one layer of the plurality of layers is a complex-valued neural network layer (e.g., a neural network layer comprising complex-valued weighting factors) configured to perform one or more operations according to a complex-valued computation. In some implementations, each layer of the plurality of layers is a complex-valued neural network layer. That is, in some implementations, the neural network comprises only complex-valued neural network layers.

In some implementations, the one or more operations to be performed by the complex-valued neural network layer include a complex-valued convolution. In some implementations, the one or more operations to be performed by the complex-valued neural network layer include a complex-valued batch normalization. In some implementations, the one or more operations to be performed by the complex-valued neural network layer include an execution of a complex-valued activation function (e.g., a complex-valued ReLU non-linearity function).

In some implementations, the complex-valued neural network layer is a first complex-valued neural network layer, and the neural network include a second complex-valued neural network layer and a third complex-valued neural network layer. In such an implementation, the first complex-valued neural network layer may be configured to perform a complex-valued convolution and an execution of a complex-valued ReLU non-linearity function; the second complex-valued neural network layer may be configured to perform a complex-valued convolution, a complex-valued batch normalization, and an execution of a complex-valued ReLU non-linearity function; and the third complex-valued neural network layer may be configured to perform a complex-valued convolution. In some implementations, the complex-valued weighting factors used by the complex-valued convolutional neural network includes values selected from a predetermined set of discrete values, as described above.

Figure 21:
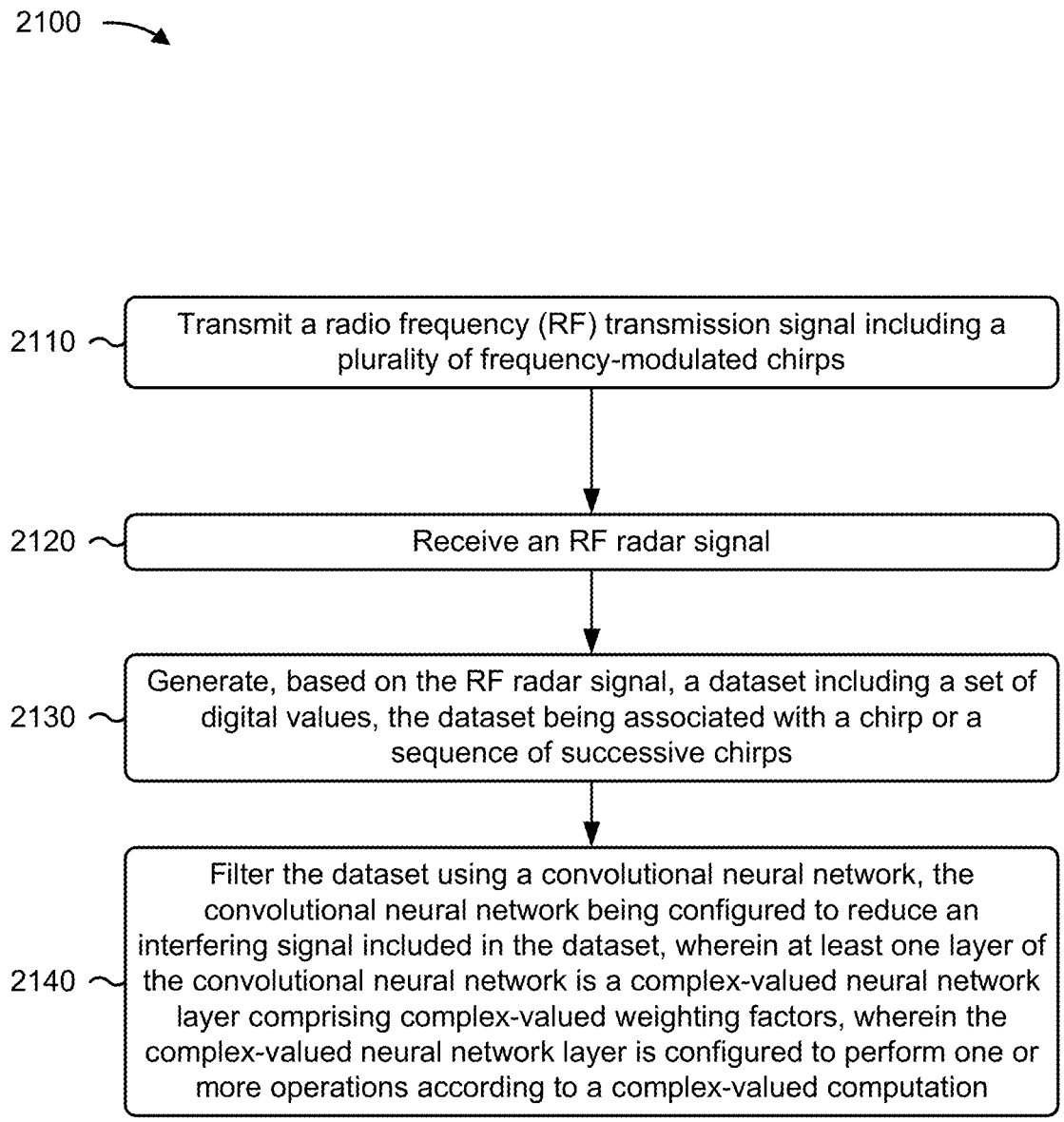
FIG. 21 is a flow chart of example process relating to filtering a dataset using a complex-valued convolutional neural network, in accordance with various aspects of the present disclosure.

FIG. 21 is a diagram of an example process relating to filtering a data using a complex-valued convolutional neural network, in accordance with various aspects of the present disclosure. In some implementations, one or more process blocks of FIG. 21 may be performed by a radar device described herein.

As shown in FIG. 21, process 2100 may include transmitting an RF transmission signal including a plurality of frequency-modulated chirps (block 2110). For example, the radar device may transmit an RF transmission signal including a plurality of frequency-modulated chirps, as described above.

As further shown in FIG. 21, process 2100 may include receiving an RF radar signal (block 2120). For example, the radar device may receive an RF radar signal, as described above.

As further shown in FIG. 21, process 2100 may include generating, based on the RF radar signal, a dataset including a set of digital values, the dataset being associated with a chirp or a sequence of successive chirps (block 2130). For example, the radar device may generate, based on the RF radar signal, a dataset including a set of digital values, the dataset being associated with a chirp or a sequence of successive chirps, as described above.

As further shown in FIG. 21, process 2100 may include filtering the dataset using a convolutional neural network, the convolutional neural network being configured to reduce an interfering signal included in the dataset, wherein at least one layer of the convolutional neural network is a complex-valued neural network layer comprising complex-valued weighting factors, wherein the complex-valued neural network layer is configured to perform one or more operations according to a complex-valued computation (block 2140). For example, the radar device may filter the dataset using a convolutional neural network, the convolutional neural network being configured to reduce an interfering signal included in the dataset, wherein at least one layer of the convolutional neural network is a complex-valued neural network layer comprising complex-valued weighting factors, wherein the complex-valued neural network layer is configured to perform one or more operations according to a complex-valued computation, as described above.

Process 2100 may include additional implementations, such as any single implementation or any combination of implementations described below and/or in connection with one or more other processes described elsewhere herein.

In a first implementation, all layers of the convolutional neural network are a complex-valued neural network layers configured to perform one or more operations according to complex-valued computations. That is, in some implementations, each layer of the convolutional neural network is a complex-valued neural network layer configured to perform one or more operations according to complex-valued computations (e.g., such that the neural network comprises only complex-valued neural network layers).

In a second implementation, alone or in combination with the first implementation, the one or more operations to be performed by the complex-valued neural network layer include at least one of a complex-valued convolution, a complex-valued batch normalization, or an execution of a complex-valued activation function (e.g., a complex-valued ReLU non-linearity function).

In a third implementation, alone or in combination with any of the first and second implementations, the complex-valued neural network layer is a first complex-valued neural network layer and the convolutional neural network includes a second complex-valued neural network layer and a third complex-valued neural network layer. Here, the first complex-valued neural network layer may be to perform a complex-valued convolution and an execution of a complex-valued ReLU non-linearity function, the second complex-valued neural network layer may be to perform a complex-valued convolution, a complex-valued batch normalization, and an execution of a complex-valued ReLU non-linearity function, and the third complex-valued neural network layer may be to perform a complex-valued convolution.

In a fourth implementation, alone or in combination with any of the first through third implementations, the complex-valued weighting factors includes values selected from a predetermined set of discrete values.

In a fifth implementation, alone or in combination with any of the first through fourth implementations, the interfering signal is a radar signal received by the radar device from an external radar device.

In a sixth implementation, alone or in combination with any of the first through fifth implementations, the radar device comprises a Fourier transformation execution unit configured to receive a digitized baseband signal and to generate the plurality of segments based on the digitized baseband signal.

In a seventh implementation, alone or in combination with any of the first through sixth implementations, a plurality of signal segments associated with the dataset corresponds to at least one of range map segments or range-Doppler map segments.

Although FIG. 21 shows example blocks of process 2100, in some implementations, process 2100 may include additional blocks, fewer blocks, different blocks, or differently arranged blocks than those depicted in FIG. 21. Additionally, or alternatively, two or more of the blocks of process 2100 may be performed in parallel.

Some of the example implementations described here are summarized below, it being pointed out that the summary below is not complete, but rather merely an example summary. One example implementation relates to a radar device with a radar transmitter and a radar receiver that may be arranged in one or in different radar chips (cf. FIG. 5). The radar transmitter is designed to output an RF transmission signal that comprises a plurality of frequency-modulated chirps (also referred to as frequency-modulated pulses) (see FIG. 6). The radar receiver is designed to receive an RF radar signal (see FIG. 9, graph (a)) and, based thereon, to generate a dataset (for example a range Doppler matrix, see FIG. 9, diagram (c)) in each case containing a particular number of digital values, wherein a dataset may be associated with a chirp or a sequence of successive chirps. The radar device furthermore comprises a neural network to which the dataset is fed and that is designed to filter the dataset in order to reduce an interfering signal contained therein (see for example FIGS. 10A-10D, 15, and 16). According to one example implementation, the neural network may be a convolutional neural network.

In one example implementation, the radar receiver is designed, based on the RF radar signal, to generate a digital radar signal in the time domain that comprises a plurality of signal segments that may be associated with a sequence of frequency-modulated chirps (see FIG. 9, graphs (b) and (c)). The signal segments form a radar data array, and the dataset is formed through two-dimensional Fourier transformation of the radar data array. The result of the two-dimensional Fourier transformation is usually referred to as a range Doppler map.

In those example implementations in which the dataset of digital values has been determined by way of Fourier transformation, the digital values of the dataset are complex values that each have a real part and an imaginary part (that is to say each complex value may be represented by a pair of real values). The neural network has an input layer with two NN channels (see for example FIG. 15). A first channel of the two NN channels delivers the real parts of the complex values of the dataset (for example of the range Doppler map) as output values, and a second channel of the two NN channels delivers the imaginary parts of the complex values of the dataset as output values. The output values of the two NN channels of the input layer are the input values of the following layer. The further layers (see for example FIG. 15, layers $L_1$ to $L_s$) of the neural network may each have two or more NN channels.

In one example implementation, the last layer (output layer) has precisely two NN channels, whereas the rest of the further layers have more than two NN channels (sixteen NN channels in the example from FIG. 15). A first NN channel of the output layer delivers the real parts as output values and a second NN channel of the output layer delivers the imaginary parts of complex values of a filtered dataset in which interfering signal components are reduced. In the example from FIG. 15, this filtered dataset represents the filtered range Doppler map $\hat{X}[k,l]$. Each NN channel of each further layer (following the input layer) of the neural network delivers a number of real output values (cf. equation 9, output values $L_s[k,l,c]$) that corresponds to the number of complex values of the dataset. That is to say, the output values of each NN channel may be considered to be an N×M matrix/data array, wherein N×M also corresponds to the size of the range Doppler map.

In the example implementations described here, each layer of the neural network receives the output values of the NN channels of the respective previous layer as input values. The layers of the neural network are referred to as convolutional layers, wherein a convolution kernel is in each case associated with the NN channels of the further layers. That is to say, a convolutional layer with sixteen NN channels also uses sixteen convolution kernels. In this example, the output values of an NN channel of each of the further layers depend on a weighted sum of the input values that are fed to the respective layer. Which and how many of the input values are incorporated into the weighted sum depends on the respective convolution kernel.

A further example implementation relates to a method for a radar device, which method comprises the following: transmitting an RF transmission signal that comprises a plurality of frequency-modulated chirps (see FIG. 1, FIG. 2 and FIG. 6), and receiving an RF radar signal and generating a dataset containing in each case a particular number of digital values based on the received RF radar signal. A dataset may be associated with a chirp or a sequence of successive chirps. The method furthermore comprises filtering the dataset by way of a neural network to which the dataset is fed in order to reduce an interfering signal contained therein (see for example FIGS. 10A-10D, FIG. 15 and FIG. 16). According to the example implementations described here, the neural network may be a convolutional neural network. The features mentioned above with reference to the radar device also of course relate to the method.

What is claimed is:

1. A radar device associated with a first vehicle, the radar device comprising:
   a radar receiver configured to:
      receive a radio frequency (RF) radar signal and,
      generate a digital signal based on the RF radar signal, the digital signal comprising a plurality of signal segments; and
   a neural network comprising a plurality of layers, each layer of the plurality of layers having one or more neurons,
   wherein at least one layer of the plurality of layers is a complex-valued neural network layer comprising complex-valued weighting factors selected by the neural network from a predetermined set of discrete values, wherein the complex-valued neural network layer is configured to perform one or more operations according to a complex-valued computation and the complex-valued weighting factors, and
   wherein an output layer of the plurality of layers has at least one neuron that delivers an output value that indicates whether a respective signal segment or a sample of the respective signal segment of the plurality of signal segments, associated with the at least one neuron, is overlaid with an interfering signal generated by a radar sensor associated with a second vehicle different from the first vehicle.

2. The radar device of claim 1, wherein each layer of the plurality of layers is a complex-valued neural network layer configured to perform one or more operations according to complex-valued computations.

3. The radar device of claim 1, wherein the neural network comprises only complex-valued neural network layers.

4. The radar device of claim 1, wherein the one or more operations to be performed by the complex-valued neural network layer include a complex-valued convolution.

5. The radar device of claim 1, wherein the one or more operations to be performed by the complex-valued neural network layer include a complex-valued batch normalization.

6. The radar device of claim 1, wherein the one or more operations to be performed by the complex-valued neural network layer include an execution of a complex-valued activation function.

7. The radar device of claim 6, wherein the complex-valued activation function is a complex-valued rectifier linear unit (ReLU) non-linearity function.

8. The radar device of claim 1, wherein the complex-valued neural network layer is a first complex-valued neural network layer and the plurality of layers include a second complex-valued neural network layer and a third complex-valued neural network layer,
   wherein the first complex-valued neural network layer is configured to perform a complex-valued convolution followed by an execution of a complex-valued rectifier linear unit (ReLU) non-linearity function,
   wherein the second complex-valued neural network layer is configured to perform a complex-valued convolution, followed by a complex-valued batch normalization, and further followed by an execution of a complex-valued ReLU non-linearity function,
   wherein the third complex-valued neural network layer is configured to perform a complex-valued convolution, and
   wherein the second complex-valued neural network layer in arranged between the first complex-valued neural network layer and the third complex-valued neural network layer.

9. The radar device of claim 1, wherein the interfering signal is a radar signal received by the radar device from an external radar device.

10. The radar device of claim 1, wherein the radar device comprises a digital signal processor configured to receive a digitized baseband signal and apply a Fourier transform to the digitized baseband signal to generate the plurality of signal segments.

11. The radar device off claim 1, wherein the plurality of signal segments corresponds to at least one of range map segments or range-Doppler map segments.

12. The radar device of claim 1, wherein the plurality of signal segments are discrete frequency values of a range map, range-Doppler map, or an angle-Doppler map, wherein each discrete frequency value corresponds to a different frequency bin.

13. The radar device of claim 1, wherein possible values for the complex-valued weighting factors selected by the neural network are limited to the discrete values in the predetermined set of discrete values.

14. A radar device associated with a first vehicle, the radar device comprising:
   a radar transmitter configured to output a radio frequency (RF) transmission signal including a plurality of frequency-modulated chirps,
   a radar receiver configured to:
      receive an RF radar signal, wherein the RF radar signal is overlaid with an interfering signal that originates from a radar sensor associated with a second vehicle different from the first vehicle,
      generate, based on the RF radar signal, a dataset including a set of digital values, the dataset being associated with a chirp or a sequence of successive chirps; and
   a neural network configured to filter the dataset to reduce the interfering signal included in the dataset, the neural network is a convolutional neural network,
      wherein at least one layer of the neural network is a complex-valued neural network layer comprising complex-valued weighting factors selected by the neural network from a predetermined set of discrete values, wherein the complex-valued neural network layer is configured to perform one or more operations according to a complex-valued computation and the complex-valued weighting factors,
      wherein the neural network is configured to update the complex-valued weighting factors by selecting updated complex-valued weighting factors from the predetermined set of discrete values.

15. The radar device of claim 14, wherein each layer of the neural network is a complex-valued neural network layer configured to perform one or more operations according to complex-valued computations.

16. The radar device of claim 14, wherein the one or more operations to be performed by the complex-valued neural network layer include at least one of a complex-valued convolution, a complex-valued batch normalization, or an execution of a complex-valued activation function.

17. The radar device of claim 14, wherein the complex-valued neural network layer is a first complex-valued neural network layer and the neural network further includes a second complex-valued neural network layer and a third complex-valued neural network layer,
   wherein the first complex-valued neural network layer is configured to perform a complex-valued convolution followed by an execution of a complex-valued rectifier linear unit (ReLU) non-linearity function,
   wherein the second complex-valued neural network layer is configured to perform a complex-valued convolution, followed by a complex-valued batch normalization, and further followed by an execution of a complex-valued ReLU non-linearity function,
   wherein the third complex-valued neural network layer is configured to perform a complex-valued convolution, and
   wherein the second complex-valued neural network layer in arranged between the first complex-valued neural network layer and the third complex-valued neural network layer.

18. A method, comprising:
   transmitting, by a radar device associated with a first vehicle, a radio frequency (RF) transmission signal including a plurality of frequency-modulated chirps;
   receiving, by the radar device, an RF radar signal, wherein the RF radar signal is overlaid with an interfering signal that originates from a radar sensor associated with a second vehicle different from the first vehicle;
   generating, by the radar device, based on the RF radar signal, a dataset including a set of digital values, the dataset being associated with a chirp or a sequence of successive chirps of the RF transmission signal and associated with the interfering signal;
   selecting, by a convolutional neural network of the radar device, complex-valued weighting factors from a predetermined set of discrete values; and
   filtering, by the radar device, the dataset using the convolutional neural network, the convolutional neural network being configured to reduce the interfering signal included in the dataset,
      wherein at least one layer of the convolutional neural network is a complex-valued neural network layer comprising the complex-valued weighting factors, wherein the complex-valued neural network layer is configured to perform one or more operations according to a complex-valued computation and the complex-valued weighting factors.

19. The method of claim 18, wherein all layers of the convolutional neural network are a complex-valued neural network layers configured to perform one or more operations according to complex-valued computations.

20. The method of claim 18, wherein the one or more operations to be performed by the complex-valued neural network layer include at least one of a complex-valued convolution, a complex-valued batch normalization, or an execution of a complex-valued activation function.

* * * * *